(12) United States Patent
Garner et al.

(10) Patent No.: US 8,932,718 B2
(45) Date of Patent: Jan. 13, 2015

(54) COATING SYSTEMS FOR CEMENT COMPOSITE ARTICLES

(75) Inventors: Archie W. Garner, Ham Lake, MN (US); T. Howard Killilea, North Oaks, MN (US); Carl Lewis Cavallin, Albertville, MN (US); Todd A. Peterson, Ham Lake, MN (US); Kevin W. Evanson, Maple Grove, MN (US); Dan Hartinger, Hudson, WI (US); Larry B. Brandenburger, Circle Pines, MN (US)

(73) Assignee: Valspar Sourcing, Inc., Minneapolis, MN (US)

( * ) Notice: Subject to any disclaimer, the term of this patent is extended or adjusted under 35 U.S.C. 154(b) by 1221 days.

(21) Appl. No.: 11/775,080

(22) Filed: Jul. 9, 2007

(65) Prior Publication Data

US 2008/0008895 A1    Jan. 10, 2008

Related U.S. Application Data

(60) Provisional application No. 60/819,505, filed on Jul. 7, 2006, provisional application No. 60/898,621, filed on Jan. 30, 2007.

(51) Int. Cl.
*B32B 27/36* (2006.01)
*C08C 1/08* (2006.01)
(Continued)

(52) U.S. Cl.
CPC .............. *C04B 41/483* (2013.01); *C04B 26/14* (2013.01); *C04B 41/009* (2013.01); *C04B 41/52* (2013.01); *C04B 41/63* (2013.01); *C04B 41/71* (2013.01); *C08F 265/04* (2013.01);
(Continued)

(58) Field of Classification Search
USPC .......................................................... 428/413
See application file for complete search history.

(56) References Cited

U.S. PATENT DOCUMENTS

| 2,128,961 A | 9/1938 | Patterson |
| 2,356,542 A | 8/1944 | Sloan |

(Continued)

FOREIGN PATENT DOCUMENTS

| AU | 198060655 A1 | 3/1981 |
| AU | 2005100347 B4 | 5/2005 |

(Continued)

OTHER PUBLICATIONS

Epoxy Resins Chemistry and Technology 2nd Edition, Revised and Expanded—Tanaka, Yoshio: Synthesis and Characteristics of Epoxides, p. 54. 1988. http://books.google.com/books?id=b2zipv8_yQUC&q=aliphatic#v=onepage&q=aliphatic&f=false.*

(Continued)

*Primary Examiner* — Callie Shosho
*Assistant Examiner* — Coris Fung
(74) *Attorney, Agent, or Firm* — IPLM Group, P.A.

(57) ABSTRACT

A coating system, a method of coating a substrate, and a coated substrate (e.g., a coated cement fiberboard article) include one or more latex polymers, an aliphatic epoxy resin system, optionally a silicate additive, and optionally one or more olefinic compounds and an initiator. The coating system may be applied in one or more layers and may be applied to all the surfaces of the substrate (e.g., the front side, back side and edges of a board). The coated substrate may then be coated with other optional coatings, e.g., decorative or protective topcoats.

27 Claims, 1 Drawing Sheet

(51) Int. Cl.
*C08J 3/16* (2006.01)
*C04B 41/48* (2006.01)
*C04B 26/14* (2006.01)
*C04B 41/00* (2006.01)
*C04B 41/52* (2006.01)
*C04B 41/63* (2006.01)
*C04B 41/71* (2006.01)
*C08F 265/04* (2006.01)
*C08F 291/00* (2006.01)
*C09D 133/06* (2006.01)
*C09D 133/14* (2006.01)
*C09D 151/00* (2006.01)
*C09D 163/00* (2006.01)
*C04B 103/00* (2006.01)
*C04B 111/00* (2006.01)
*C08L 63/00* (2006.01)

(52) U.S. Cl.
CPC ......... *C08F 291/00* (2013.01); *C09D 133/068* (2013.01); *C09D 133/14* (2013.01); *C09D 151/003* (2013.01); *C09D 163/00* (2013.01); *C04B 2103/0065* (2013.01); *C04B 2111/00482* (2013.01); *C08L 63/00* (2013.01)
USPC ........................... 428/413; 523/335; 523/352

(56) References Cited

U.S. PATENT DOCUMENTS

| | | |
|---|---|---|
| 2,633,458 A | 3/1953 | Shokal |
| 2,674,775 A | 4/1954 | Willson |
| 2,727,012 A | 12/1955 | Treat et al. |
| 2,730,517 A | 1/1956 | Vogel et al. |
| 3,010,919 A | 11/1961 | MacKinney et al. |
| 3,049,458 A | 8/1962 | Willard |
| 3,091,551 A | 5/1963 | Robertson |
| 3,219,467 A | 11/1965 | Redican et al. |
| 3,380,831 A | 4/1968 | Cohen et al. |
| 3,449,161 A | 6/1969 | Hindersinn et al. |
| 3,481,894 A | 12/1969 | Lima et al. |
| 3,655,423 A | 4/1972 | Lin et al. |
| 3,781,396 A | 12/1973 | Okuda et al. |
| 3,804,735 A * | 4/1974 | Radlove et al. ................. 522/48 |
| 3,899,611 A | 8/1975 | Hall |
| 3,935,173 A | 1/1976 | Ogasawara et al. |
| 3,935,364 A | 1/1976 | Proksch et al. |
| 3,952,032 A | 4/1976 | Vrancken et al. |
| 3,970,628 A | 7/1976 | Connelly et al. |
| 3,986,996 A * | 10/1976 | Villa et al. ..................... 524/705 |
| 3,991,136 A | 11/1976 | Dalton et al. |
| 4,015,040 A | 3/1977 | Yoshida et al. |
| 4,028,294 A | 6/1977 | Brown et al. |
| 4,113,893 A | 9/1978 | Hahn |
| 4,132,526 A | 1/1979 | Schwarz et al. |
| 4,197,389 A | 4/1980 | Becker et al. |
| 4,211,848 A | 7/1980 | Blount |
| 4,228,761 A | 10/1980 | Glover et al. |
| 4,324,822 A * | 4/1982 | Kobayashi et al. ........ 220/62.14 |
| 4,333,867 A | 6/1982 | Sauntson |
| 4,385,152 A | 5/1983 | Boyack et al. |
| 4,390,688 A | 6/1983 | Walz et al. |
| 4,408,018 A | 10/1983 | Bartman et al. |
| 4,486,553 A | 12/1984 | Wesch |
| 4,522,962 A * | 6/1985 | Abbey et al. ................. 523/410 |
| 4,528,307 A | 7/1985 | Fuhr et al. |
| 4,536,534 A | 8/1985 | Singer et al. |
| 4,582,755 A | 4/1986 | Dietrich |
| 4,598,108 A | 7/1986 | Hoefs |
| 4,719,149 A | 1/1988 | Aasen et al. |
| 4,737,577 A | 4/1988 | Brown |
| 4,742,121 A | 5/1988 | Toman |
| 4,782,109 A | 11/1988 | DuLaney et al. |
| 4,791,152 A * | 12/1988 | Adeney et al. ................. 523/406 |
| 4,822,828 A | 4/1989 | Swofford |
| 4,822,858 A | 4/1989 | Pivotto et al. |
| 4,852,316 A | 8/1989 | Webb |
| 4,880,660 A | 11/1989 | Aasen et al. |
| 4,886,852 A | 12/1989 | Numa |
| 4,904,522 A | 2/1990 | Markusch |
| 4,908,229 A | 3/1990 | Kissel |
| 4,916,004 A | 4/1990 | Ensminger et al. |
| 5,017,632 A | 5/1991 | Bredow et al. |
| 5,073,578 A | 12/1991 | Boodaghains et al. |
| 5,075,370 A | 12/1991 | Kubitza et al. |
| 5,100,948 A | 3/1992 | Aydin et al. |
| 5,157,074 A | 10/1992 | Metzger et al. |
| 5,191,012 A | 3/1993 | Markusch et al. |
| 5,212,230 A | 5/1993 | Tirpak et al. |
| 5,221,710 A | 6/1993 | Markusch et al. |
| 5,236,994 A | 8/1993 | Markusch et al. |
| 5,262,444 A | 11/1993 | Rusincovitch et al. |
| 5,296,530 A | 3/1994 | Bors et al. |
| 5,356,716 A | 10/1994 | Patel |
| 5,371,148 A | 12/1994 | Taylor et al. |
| 5,407,783 A | 4/1995 | Caruso |
| 5,409,984 A | 4/1995 | Gerhardinger et al. |
| 5,418,264 A | 5/1995 | Obloh et al. |
| 5,426,142 A | 6/1995 | Rosano et al. |
| 5,461,125 A | 10/1995 | Lu et al. |
| 5,468,804 A | 11/1995 | Schmalstieg et al. |
| 5,478,601 A | 12/1995 | Larson et al. |
| 5,484,849 A | 1/1996 | Bors et al. |
| 5,500,457 A | 3/1996 | Sarkar et al. |
| 5,534,310 A | 7/1996 | Rokoski et al. |
| 5,559,192 A | 9/1996 | Bors et al. |
| 5,562,953 A | 10/1996 | Bors et al. |
| 5,567,767 A | 10/1996 | Smeal et al. |
| 5,569,686 A * | 10/1996 | Makati et al. ................. 523/409 |
| 5,571,863 A | 11/1996 | Smeal et al. |
| 5,672,379 A | 9/1997 | Schall et al. |
| 5,679,721 A | 10/1997 | Courtoy et al. |
| 5,681,385 A | 10/1997 | Beckenhauer |
| 5,688,867 A | 11/1997 | Scheibelhoffer et al. |
| 5,708,077 A | 1/1998 | Nölken et al. |
| 5,708,093 A | 1/1998 | Bastelberger et al. |
| 5,718,943 A | 2/1998 | Hsu et al. |
| 5,744,078 A | 4/1998 | Soroushian et al. |
| 5,766,768 A | 6/1998 | Cummings et al. |
| 5,777,053 A | 7/1998 | McBain et al. |
| 5,780,117 A | 7/1998 | Swartz et al. |
| 5,798,426 A | 8/1998 | Anton et al. |
| 5,814,397 A | 9/1998 | Cagliostro et al. |
| 5,859,095 A * | 1/1999 | Moyle et al. ................. 523/402 |
| 5,869,590 A * | 2/1999 | Clark et al. ................... 526/323 |
| 5,874,503 A | 2/1999 | Scheibelhoffer et al. |
| 5,928,778 A | 7/1999 | Takahashi et al. |
| 5,945,044 A | 8/1999 | Kawai et al. |
| 5,962,571 A | 10/1999 | Overbeck et al. |
| 5,973,068 A | 10/1999 | Yamaya et al. |
| 5,994,428 A | 11/1999 | Lutz et al. |
| 5,997,952 A | 12/1999 | Harris et al. |
| 6,007,619 A | 12/1999 | Laas et al. |
| 6,008,289 A | 12/1999 | König et al. |
| 6,011,078 A | 1/2000 | Reich et al. |
| 6,028,155 A * | 2/2000 | Collins et al. ................. 526/270 |
| 6,030,447 A | 2/2000 | Naji et al. |
| 6,045,871 A | 4/2000 | Matt et al. |
| 6,045,873 A | 4/2000 | Adachi et al. |
| 6,048,471 A | 4/2000 | Henry |
| 6,063,864 A | 5/2000 | Mathur et al. |
| 6,103,352 A | 8/2000 | Takahashi |
| 6,114,440 A | 9/2000 | Yamaya et al. |
| 6,136,383 A | 10/2000 | Schwartz et al. |
| 6,146,710 A | 11/2000 | Symons |
| 6,146,711 A | 11/2000 | Courtoy et al. |
| 6,162,511 A | 12/2000 | Garnett et al. |
| 6,235,228 B1 | 5/2001 | Nicholl et al. |
| 6,297,320 B1 | 10/2001 | Tang et al. |
| 6,346,146 B1 | 2/2002 | Duselis et al. |
| 6,395,827 B1 | 5/2002 | Pears et al. |
| 6,398,976 B1 * | 6/2002 | Sandoval et al. ................. 252/62 |
| 6,417,267 B1 * | 7/2002 | Stockl et al. ................... 524/808 |
| 6,426,414 B1 | 7/2002 | Laas et al. |

(56) References Cited

U.S. PATENT DOCUMENTS

| | | | |
|---|---|---|---|
| 6,453,960 B1* | 9/2002 | Kondo et al. | 152/451 |
| 6,458,250 B1 | 10/2002 | Holliday et al. | |
| 6,475,556 B1* | 11/2002 | Sobczak et al. | 427/137 |
| 6,485,601 B1 | 11/2002 | Egan et al. | |
| 6,485,793 B1 | 11/2002 | Ott et al. | |
| 6,492,450 B1 | 12/2002 | Hsu | |
| 6,506,248 B1 | 1/2003 | Duselis et al. | |
| 6,528,610 B1* | 3/2003 | Frouin et al. | 528/85 |
| 6,534,176 B2 | 3/2003 | Terase et al. | |
| 6,555,625 B1 | 4/2003 | Overbeek et al. | |
| 6,590,025 B1 | 7/2003 | Carlson et al. | |
| 6,635,735 B1 | 10/2003 | Zhang et al. | |
| 6,638,567 B1 | 10/2003 | Beisele | |
| 6,638,998 B2* | 10/2003 | Zhao et al. | 524/127 |
| 6,641,629 B2 | 11/2003 | Safta et al. | |
| 6,649,679 B1 | 11/2003 | Stockl et al. | |
| 6,660,386 B2 | 12/2003 | Haque | |
| 6,696,518 B1 | 2/2004 | Dersch et al. | |
| 6,740,423 B2 | 5/2004 | Murase | |
| 6,753,394 B2 | 6/2004 | Weikard et al. | |
| 6,762,230 B2 | 7/2004 | Brandenburger et al. | |
| 6,777,458 B1 | 8/2004 | Jaworek et al. | |
| 6,818,697 B2 | 11/2004 | Zhang et al. | |
| 6,849,338 B2 | 2/2005 | Clemens et al. | |
| 6,893,751 B2 | 5/2005 | Naji et al. | |
| 6,941,720 B2 | 9/2005 | DeFord et al. | |
| 6,998,012 B2 | 2/2006 | Koelliker et al. | |
| 7,049,352 B2 | 5/2006 | Gould et al. | |
| 7,101,921 B2 | 9/2006 | Edwards et al. | |
| 7,105,593 B2 | 9/2006 | Solomon et al. | |
| 7,148,270 B2 | 12/2006 | Bowe | |
| 7,235,595 B2 | 6/2007 | Hermes et al. | |
| 7,235,603 B2 | 6/2007 | Madle et al. | |
| 7,238,391 B2 | 7/2007 | Dargontina et al. | |
| 7,247,671 B2 | 7/2007 | Overbeek et al. | |
| 7,265,166 B2 | 9/2007 | Gebhard et al. | |
| 7,338,989 B2 | 3/2008 | Gross et al. | |
| 7,381,785 B2 | 6/2008 | Detrembleur et al. | |
| 7,449,516 B2 | 11/2008 | Bayer et al. | |
| 7,758,954 B2 | 7/2010 | Nguyen et al. | |
| 7,812,090 B2 | 10/2010 | Killilea et al. | |
| 2002/0007009 A1 | 1/2002 | Stark et al. | |
| 2002/0009622 A1 | 1/2002 | Goodson | |
| 2002/0081437 A1* | 6/2002 | Dargontina et al. | 428/425.1 |
| 2002/0179240 A1 | 12/2002 | Clemens et al. | |
| 2002/0195191 A1 | 12/2002 | Weiss et al. | |
| 2003/0027915 A1 | 2/2003 | Gerst et al. | |
| 2003/0055171 A1 | 3/2003 | Overbeek et al. | |
| 2003/0073778 A1 | 4/2003 | Zhang et al. | |
| 2003/0089061 A1 | 5/2003 | DeFord et al. | |
| 2003/0150359 A1 | 8/2003 | Lassmann | |
| 2003/0153673 A1 | 8/2003 | Schwalm et al. | |
| 2003/0203991 A1 | 10/2003 | Schottman et al. | |
| 2003/0207121 A1 | 11/2003 | McGee | |
| 2003/0211346 A1* | 11/2003 | Kausch | 428/483 |
| 2003/0224184 A1 | 12/2003 | Hermes et al. | |
| 2004/0002559 A1* | 1/2004 | Troutman et al. | 524/100 |
| 2004/0044094 A1 | 3/2004 | Garnett | |
| 2004/0063809 A1 | 4/2004 | Fu et al. | |
| 2004/0068045 A1 | 4/2004 | Betremieux et al. | |
| 2004/0077782 A1 | 4/2004 | Heldmann et al. | |
| 2004/0082715 A1 | 4/2004 | Bayer et al. | |
| 2004/0086676 A1 | 5/2004 | Peng | |
| 2004/0161542 A1 | 8/2004 | Ziemann et al. | |
| 2004/0176502 A1 | 9/2004 | Raymond et al. | |
| 2004/0198903 A1 | 10/2004 | Madle et al. | |
| 2004/0229978 A1 | 11/2004 | Bowe | |
| 2005/0009954 A1 | 1/2005 | Gebhard et al. | |
| 2005/0020718 A1 | 1/2005 | Gosse et al. | |
| 2005/0027079 A1 | 2/2005 | Palmer Lauer et al. | |
| 2005/0053797 A1 | 3/2005 | Rumph et al. | |
| 2005/0126430 A1 | 6/2005 | Lightner, Jr. et al. | |
| 2005/0176321 A1 | 8/2005 | Crette et al. | |
| 2005/0203211 A1 | 9/2005 | Gebhard | |
| 2005/0208285 A1 | 9/2005 | Lyons et al. | |
| 2006/0013950 A1 | 1/2006 | Porter et al. | |
| 2006/0024480 A1 | 2/2006 | Lyons et al. | |
| 2006/0046068 A1 | 3/2006 | Barancyk et al. | |
| 2006/0048708 A1 | 3/2006 | Hartig | |
| 2006/0111503 A1 | 5/2006 | Killilea et al. | |
| 2006/0135684 A1 | 6/2006 | Killilea | |
| 2006/0135686 A1 | 6/2006 | Killilea et al. | |
| 2006/0182946 A1 | 8/2006 | Zarb et al. | |
| 2006/0288909 A1 | 12/2006 | Naji et al. | |
| 2007/0027233 A1* | 2/2007 | Yamaguchi et al. | 523/467 |
| 2007/0042192 A1 | 2/2007 | Nguyen et al. | |
| 2007/0110981 A1 | 5/2007 | Killilea et al. | |
| 2007/0149077 A1 | 6/2007 | Stanislawczyk et al. | |
| 2007/0213445 A1 | 9/2007 | Klijn et al. | |
| 2007/0259166 A1 | 11/2007 | Killilea et al. | |
| 2007/0259188 A1 | 11/2007 | Wu et al. | |
| 2007/0269660 A1* | 11/2007 | Killilea et al. | 428/414 |
| 2007/0282046 A1 | 12/2007 | Killilea et al. | |
| 2008/0008895 A1 | 1/2008 | Garner et al. | |
| 2008/0139737 A1 | 6/2008 | Alderfer et al. | |
| 2008/0141908 A1 | 6/2008 | Peng et al. | |
| 2008/0275155 A1 | 11/2008 | Wagner et al. | |
| 2008/0300338 A1 | 12/2008 | Wagner et al. | |
| 2009/0004468 A1 | 1/2009 | Chen et al. | |

FOREIGN PATENT DOCUMENTS

| | | |
|---|---|---|
| CN | 1182724 A | 5/1998 |
| DE | 33 02 767 A1 | 8/1984 |
| EP | 0 060 505 A1 | 9/1982 |
| EP | 0 486 278 A1 | 5/1992 |
| EP | 0 623 659 A2 | 11/1994 |
| EP | 0 640 629 A1 | 3/1995 |
| EP | 0 697 417 A1 | 2/1996 |
| EP | 0 705 855 A2 | 4/1996 |
| EP | 0 725 088 A1 | 8/1996 |
| EP | 0 728 779 B2 | 8/1996 |
| EP | 0 757 059 A1 | 2/1997 |
| EP | 0 894 780 A1 | 2/1999 |
| EP | 1 118 632 A2 | 7/2001 |
| EP | 1 170 340 A1 | 1/2002 |
| EP | 1 454 935 A1 | 9/2004 |
| EP | 1 473 331 A1 | 11/2004 |
| EP | 1 505 088 A1 | 2/2005 |
| EP | 1 505 127 A1 | 2/2005 |
| EP | 1 589 083 A2 | 10/2005 |
| EP | 1 650 045 A2 | 4/2006 |
| EP | 1 798 258 A1 | 6/2007 |
| GB | 1 407 827 | 9/1975 |
| GB | 2 148 871 A | 6/1985 |
| JP | 54 038323 | 3/1979 |
| JP | 01 229242 | 9/1989 |
| JP | 02 308887 | 12/1990 |
| JP | 08 059939 | 3/1996 |
| JP | 11 236281 | 8/1999 |
| JP | 03 44986 A | 12/2000 |
| JP | 2003 226835 A | 8/2003 |
| JP | 2003251269 | 9/2003 |
| JP | 2004 010805 A | 1/2004 |
| JP | 2004 250607 A2 | 9/2004 |
| JP | 2004 292748 A2 | 10/2004 |
| JP | 2005 307161 | 4/2005 |
| JP | 2006 117812 | 5/2006 |
| SU | 833892 | 5/1981 |
| WO | WO 94/07674 A1 | 4/1994 |
| WO | WO 94/25499 A1 | 11/1994 |
| WO | WO 98/45222 | 10/1998 |
| WO | WO 99/67312 | 12/1999 |
| WO | WO 00/23495 A1 | 4/2000 |
| WO | WO 00/56826 | 9/2000 |
| WO | WO 01/68547 A1 | 9/2001 |
| WO | WO 02/070623 A2 | 9/2002 |
| WO | WO 03/000761 A1 | 1/2003 |
| WO | WO 03/076536 A1 | 9/2003 |
| WO | WO 03/101918 A2 | 12/2003 |
| WO | WO2004108825 * | 12/2004 |
| WO | WO 2005/071179 A1 | 8/2005 |
| WO | WO 2006/032512 A | 3/2006 |
| WO | WO 2006/065914 A1 | 6/2006 |

(56) References Cited

FOREIGN PATENT DOCUMENTS

| WO | WO 2007/059516 A1 | 5/2007 |
|---|---|---|
| WO | WO 2007/087458 A1 | 8/2007 |
| WO | WO/2007/089807 A2 | 8/2007 |
| WO | WO 2007/089913 A1 | 8/2007 |
| WO | WO 2007/090132 A1 | 8/2007 |
| WO | WO 2007/143622 A1 | 12/2007 |
| WO | WO 2008/018910 A2 | 2/2008 |

OTHER PUBLICATIONS

Michigan State University Extension—Home Maintenance and Repair: Paint Problems, Jun., 24, 2003. http://www.msue.msu.edu/objects/content_revision/download.cfm/revision_id.498884/workspace_id.4/01500572.html/.*
Wacker Polymers, VINNAPAS® EF811. Retrieved on Mar. 25, 2009.*
Arkema Coating Resins, NEOCAR® Latex 2535. Oct. 2012.*
ISR and Written Opinion PCT/US2007/073070 dated Nov. 2, 2007.
ASTM D6944-03, Test Method A.
Koleske et al., *Two Thousand Three Additives Guide*, Paint and Coatings Industry, Apr. 2003, pp. 1-76.
Witzeman, J. S. et al., *Comparison of Methods for the Preparation of Acetoacetylated Coating Resins*, Coatings Technology; vol. 62, No. 789, Oct. 1990, pp. 101-112 (and references contained therein).
Clemens, R. J. et al., *A Comparison of Catalysts for Crosslinking Acetoacetylated Resins via the Michael Reaction*, Journal of Coatings Technology, Mar. 1989, vol. 61, No. 770, pp. 83-91.
Clemens, R. J., *A Comparison of Catalysts for Crosslinking Acetoacetylated Resins via the Michael Reaction*, Water-Borne & Higher Solids Coatings Symposium, 1988, New Orleans, LA, 55-67.
Wicks, Z.W. et al., *Epoxy and Phenolic Resins*, Organic Coatings Science and Technology, vol. 1, Chapter XI, pp. 162-187.
Tennebroek et al., *New Polymer Synthesis for (self) Crosslinkable Urethanes and Urethane Acrylics*, 4th Nürnberg Congress; International Centre for Coatings Technology, Paper 17, 2000, 19 pages.
Geurts, J.M. et al., *Self-crosslinkable Urethanes and Urethane/Acrylics*, Verfkroniek Nummer, Jan. 1999.
Geon® Lo-Sope Dispersion Resin, Geon® 171 Vinyl Chloride Homopolymer Technical Data Sheet, PolyOne Corporation, May 2003, 2 pages.
Geon Copolymer Dispersion Resin Geon® 137 Vinyl Chloride Copolymer Technical Data Sheet, PolyOne Corporation, Apr. 1997, 2 pages.
Industrial Research Services, *Test Report No. 54703-I for Epirez Safe Step 100*, CSIRO, Manuf. & Infrastr. Technology, Australia, May 2004, pp. 1-6.
DSM NeoResins, Technical Data Sheet, DSM NeoResins Inc.,Bulletin XK-90, Jan. 2006, 6 pages.
Tex•Cote® Stretch Product Information, Textured Coatings of America, Inc., Panama City, Florida, Nov. 2003, 3 pages.
UCAR Emulsion Systems Applications, *Architectural Coatings-Exterior-Cement Fiber Board*, Dow Chemical Company product information sheet printed on Oct. 25, 2007 from the following internet archives website at: http://web.archive.org/web/20041022123748/http://www.dow.com/ucarlatex/app/arch/ex_fiber.htm.
Rector, F.D. et al., *Applicatons for the Acetoacetyl Chemistry in Thermoset Coatings*, Journal of Coatings Technology, vol. 61, No. 771, Apr. 1989.
ASTM D6944-03, Test Method A (2003).
Koleske et al., *Two Thousand Three Additives Guide*, Paint and Coatings Industry, pp. 12-86, (Apr. 2003).
Witzeman, J. S. et al., *Comparison of Methods for the Preparation of Acetoacetylated Coating Resins*, Coatings Technology; vol. 62, No. 789, pp. 101-112 (Oct. 1990).
American Society of Testing Materials, ASTM Designation: D523-89, "Standard Test Method for Specular Gloss;" 5 pages, (Reapproved 1999).

American Society of Testing Materials, ASTM Designation: D5402-93, "Standard Practice for Assessing the Solvent Resistance of Organic Coatings Using Solvent Rubs;" 3 pages, (Reapproved 1999).
Eastman Chemical Company, Publications N-319C, Kingport, TN., Title Page, Table of Contents, "Acetoacetoxyethyl Methacrylate (AAEM) Acetoacetyl Chemistry," pp. 1-11, (Dec. 1999).
Lewis et al., "Luminescence", Hawley's Condensed Chemical Dictionary, 14th Ed., John Wiley and Sons, Inc., retrieved from Knovel® online; 1 page (2002).
"Photoinitiators for UV Curing," "Darocur 1173", p. 2; Ciba Specialty Chemicals; 8 pages (2003).
U.S. Federal Register, vol. 60, No. 116, pp. 31633-31637, (Jun. 16, 1995).
Wicks, Zeno W. Jr., et al., "Latexes", Organic Coatings, Science and Technology, Second Edition, (Wiley-Interscience, New York), Title Page, Copyright Page, Chapter 8, p. 143, (1999).
Dow® Z-6018 Intermediate Product Information, "Silicone Intermediates", 3 pgs., (Aug. 28, 2006).
"Ancarez AR550 Waterborne Epoxy Resin Technical Bulletin", Air Products and Chemicals, Inc., High Performance Coatings Resins, Pub. No. 125-9914, 13 pages, (Mar. 2006).
"Anquamine 401 Curing Agent Technical Bulletin", Air Products and Chemicals, Inc., Epoxy Curing Agents and Modifiers, Publication No. 125-9744,1 page, (May, 2004).
"Polycat 41 Catalyst", Product Information Sheet, Air Products and Chemicals, Inc., 2 pages, (2003).
"UV Cured Undercoat Vitrecure 7", Product Data Sheet 74, Architectural & Industrial Coatings, 1 page (Dec. 21, 2004).
"UV Cured Sealer for Cement Based Substrates Vitrecure 9", Product Data Sheet 54, Architectural & Industrial Coatings, 1 page (Jul. 24, 2004).
Fox, T. G., "Influence of diluent and of copolymer composition on the glass temperature of a polymer system", Bull. Am. Phys. Soc. I (3), 123 (1956).
Hardiplank® Lap Siding Installation, James Hardie Siding Products, 8 pages, (Dec. 2005), http://www.jameshardie.com/homeowner/technical/installation/hardieplank_installation.php, downloaded from the Dec. 15, 2005 Internet Archive entry at: http://web.archive.org/web/20051215084041/http://www.jameshardie.com/homeowner/installation/hardiplank_installation.php.
"Siding Painting Tips", Paint Manufacturers' Recommendation Sheet—No. S-100, James Hardie Siding Products, 10 pages, (May 2005), http://www.jameshardie.com/homeowner/technical/paintingtips.php, downloaded from the Dec. 14, 2005 Internet Archive entry at: http://web.archive.org/web/20051214022056/http://www.jameshardie.com/homeowner/technical/paintingtips.php.
PQ® Potassium Silicates, PQ Corporation Brochure, (2004).
"ASTM C920-11 Standard Specification for Elastomeric Joint Sealants" Abstract, Book of Standards, 2 pages, (vol. Apr. 2007).
"ASTM C834-10 Standard Specification for Latex Sealants" Abstract, Book of Standards, 2 pages, (vol. Apr. 2007).
Gardner's Commercially Important Chemicals, edited by G.W.A Milne, Wiley, p. 573 (2005).
NaH2PO4 MSDS, found at http://muby.itgo.com/MSDS/sodium_phosphate_monobasic_anhyd%20MSDS.htm.
Araujo, P.H.H. et al., "Techniques for Reducing Residual Monomer Content in Polymers: A Review", Polymer Engineering and Science, vol. 42, No. 7, pp. 1442-1468 (Jul. 2002).
Technical Bulletin CC 2.0, "Yellowing of Alkyd Paints", Glidden Professional®, Akzo Nobel Paints LLC, 2 pages. (Feb. 2010).
EPS 4203 Technical Data Sheet (May 25, 2011).
EPS 4203 Material Safety Data Sheet (May 10, 2013).
EPS 4213 Technical Data Sheet (May 26, 2011).
EPS 4213 Material Safety Data Sheet (May 10, 2013).
Lux 399 Technical Data Sheet (Dec. 15, 2010).
Lux 399 Material Safety Data Sheet (Apr. 29, 2011).
Celanese Emulsions, "Brilliant Aspects" Technical Data Sheets (Feb. 2005).

(56) References Cited

OTHER PUBLICATIONS

MaxiTile, Inc. Limited Warranty, MaxiLite P7 and P10, MaxiShake and MaxiSlate, SlateMax and ShakeMax, and SuperTile PVA Reinforced Roofing, 2 pages (2005).

Celanese Emulsions, "Mowilith LDM 7416" Technical Data Sheets, Version 1, 2 pages, Issue 2005/02.

Celanese Emulsion Polymers, "Mowilith LDM 7416" Technical Data Sheet, 2 pages, (Jan. 8, 2013).

Celanese Emulsions-Wood Coatings, "Industrial Wood Coatings" sheet downloaded on Aug. 2, 2013 from the Internet Archives at: http://web.archive.org/web/20061016145419/http://www.celanese.com/i.

Dach-Und Fassadenschindeln, Eternit, Preisliste 2002, 4 pages (Jan. 2002).

Highly Durable Non-Abrasive Roof Tiles, pp. 52-56, (May 2004).

Wir bei Eternit Information Sheets, 2 pages, (Aug. 1998).

\* cited by examiner

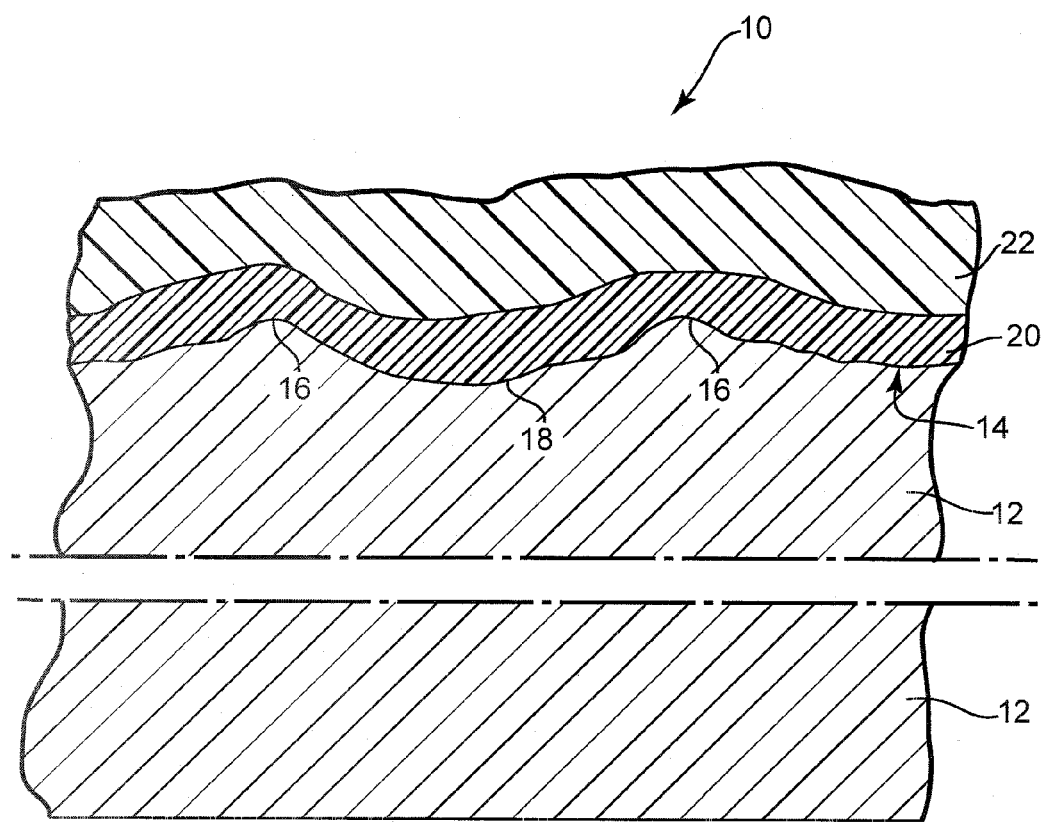

COATING SYSTEMS FOR CEMENT COMPOSITE ARTICLES

CROSS-REFERENCE TO RELATED APPLICATION

This application claims priority from U.S. Provisional Application Ser. No. 60/819,505, filed Jul. 7, 2006, and from U.S. Provisional Application Ser. No. 60/898,621, filed Jan. 30, 2007, the disclosures of which are incorporated herein by reference.

BACKGROUND OF THE INVENTION

Cement composite articles are becoming more and more common for use in building materials. Many of these articles are prepared from inexpensive materials, such as cement, wood (cellulose) fibers, natural (glass) fibers and polymers. These articles usually are prepared in the form of cement fiberboard substrates such as siding panels and boards. The substrate or articles can be made using methods such as extrusion or using a Hatschek process.

In northern climates, damage from repeated freezing and thawing of water absorbed into the cement fiberboard substrate represents a significant problem. Continued exposure to moisture, freeze-thaw cycles, UV exposure and atmospheric carbon dioxide can cause physical and chemical changes in articles made from cement fiberboard compositions over time and also damage decorative surfaces. Coating systems or coating compositions can help prevent exposure to the elements such as UV light, carbon dioxide and water, or can help reduce the damage that can occur due to exposure to these elements. Several such systems are available for protecting cement fiberboard articles. However, there is a need for coating systems and coating compositions that provide a superior seal, have the ability to cure rapidly or can provide improved results when an article coated with the composition is submitted to wet adhesion testing and multiple freeze-thaw cycles.

SUMMARY

The present invention provides in one aspect a coating composition having one or more latex polymers, and an aliphatic epoxy resin system. In certain embodiments the aliphatic epoxy resin is distinct from the one or more latex polymers. In other embodiments the aliphatic epoxy resin is part of one or more of the one or more latex polymers. The oxirane functional component in the aliphatic epoxy resin system can, in certain embodiments, have an epoxy equivalent weight less than about 1000. The coating composition can include one or more coating compositions that may be applied in one or more layers.

In another aspect the invention provides a coated article comprising a cement fiberboard substrate and a coating system applied to the substrate. The article includes a first coating system applied to the substrate, wherein the first coating system includes an aliphatic epoxy resin system having one or more aqueous dispersions of polymer particles, optionally a silicate additive, and optionally one or more olefinic compounds and initiator for same. The first coating system preferably includes one or more coating compositions that may be applied in one or more layers. In a preferred embodiment, the aqueous polymer dispersion is a latex polymer, the epoxy resin system comprises trimethylol propane triglycidyl ether and an amine, and the optional silicate additive comprises potassium silicate. In another preferred embodiment, each of the coating compositions is an aqueous composition.

In another aspect, the coated article includes: a cement fiberboard substrate, and a first coating system applied to the substrate, wherein the first coating system includes: an epoxy-functional latex polymer, an amine solution, optionally a silicate additive, and optionally one or more olefinic compounds and initiator for same.

In another aspect, an optional second coating system may be applied on top of the first coating system. The optional second coating system preferably comprises a functionalized latex polymer or a multistage latex polymer or a functionalized, multistage latex polymer. More preferably, the optional second coating system comprises an acetoacetoxy-functional multistage latex polymer.

In another aspect, the invention provides a method for preparing a coated article, which method comprises providing a cement fiberboard substrate, coating at least a portion of the substrate with the above-described coating system and radiation-curing the coating.

The above summary of the present invention is not intended to describe each disclosed embodiment or every implementation of the present invention. Other features, objects, and advantages of the invention will be apparent from the description and drawings, and from the claims. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

The details of one or more embodiments of the invention are set forth in the accompanying drawing and the description below. Other features, objects, and advantages of the invention will be apparent from the description and drawings, and from the claims.

BRIEF DESCRIPTION OF THE DRAWING

FIG. 1 is a schematic cross-sectional view of a coated fiber cement article.

Like reference symbols in the various figures of the drawing indicate like elements. The elements in the drawing are not to scale.

DETAILED DESCRIPTION

An "epoxy coating system" or "epoxy resin system" or "epoxy functional latex system" means a multi-component coating system having at least two components, a first component having oxirane groups (e.g., epoxy-functional coating composition or epoxy functional latex polymer) and a second component having reactive groups (e.g., epoxide-reactive functional groups) that can react with the oxirane group. These groups can react to cure, polymerize or crosslink the coating system.

An aqueous dispersion of polymer particles encompasses the meaning of latex polymer and water dispersible polymer.

A "latex" polymer means a dispersion or emulsion of polymer particles formed in the presence of water and one or more secondary dispersing or emulsifying agents (e.g., a surfactant, alkali-soluble polymer or mixtures thereof) whose presence is required to form the dispersion or emulsion. The secondary dispersing or emulsifying agent is typically separate from the polymer after polymer formation. In some embodiments a reactive dispersing or emulsifying agent may become part of the polymer particles as they are formed.

A "water-dispersible" polymer means a polymer which is capable of being combined by itself with water, without requiring the use of a secondary dispersing or emulsifying agent, to obtain an aqueous dispersion or emulsion of polymer particles having at least a one month shelf stability at normal storage temperatures.

The term "multistage" when used with respect to a latex means the latex polymer was made using discrete charges wherein each charge contains one or more monomers or was made using a continuously-varied charge of two or more monomers. Usually a multistage latex will not exhibit a single Tg inflection point as measured using DSC. For example, a DSC curve for a multistage latex made using discrete charges of one or more monomers may exhibit two or more Tg inflection points. Also, a DSC curve for a multistage latex made using a continuously-varied charge of two or more monomers may exhibit no Tg inflection points. By way of further explanation, a DSC curve for a single stage latex made using a single monomer charge or a non-varying charge of two monomers may exhibit only a single Tg inflection point. Occasionally when only one Tg inflection point is observed, it may be difficult to determine whether the latex represents a multistage latex. In such cases a lower Tg inflection point may sometimes be detected on closer inspection, or the synthetic scheme used to make the latex may be examined to determine whether or not a multistage latex would be expected to be produced.

The terms "a," "an," "the," "at least one," and "one or more" are used interchangeably. Thus, for example, a coating composition that comprises "an" amine can be interpreted to mean that the coating composition includes "one or more" amines.

The recitation of numerical ranges by endpoints includes all numbers subsumed within that range (e.g., 1 to 5 includes 1, 1.5, 2, 2.75, 3, 3.80, 4, 5, etc.).

The term "comprises" and variations thereof does not have a limiting meaning where such term appears in the description or claims. Thus, for example, a composition comprising a wax compound means that the composition includes one or more wax compounds.

The terms "acrylate esters" and "methacrylate esters" refer to esters of acrylic acid and ester's of methacrylic acid, respectively. They may be referred to as (meth)acrylates or (meth)acrylate ester's.

The term "olefinic compound" refers to any monomer, oligomer or polymer containing reactive ethylenic unsaturation, such as vinyls, (meth)acrylates, vinyl ethers, allyl ethers, vinyl esters, unsaturated oils (including mono, di and triglycerides), unsaturated fatty acids, and the like. The term "olefinic group" refers to the reactive ethylenic unsaturated functional group in an olefinic compound.

The terms "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

The term "organic group" refers to a hydrocarbon (e.g., hydrocarbyl) group with optional elements other than carbon and hydrogen in the chain, such as oxygen, nitrogen, sulfur, and silicon that is classified as an aliphatic group, cyclic group, or combination of aliphatic and cyclic groups (e.g., alkaryl or aralkyl groups). The term "aliphatic group" refers to a saturated or unsaturated linear or branched hydrocarbon group. For example, this term is used to encompass alkyl, alkenyl, and alkynyl groups. The term "alkyl group" refers to a saturated linear or branched hydrocarbon group including, for example, methyl, ethyl, isopropyl, t-butyl, heptyl, dodecyl, octadecyl, amyl, 2-ethylhexyl, and the like. The term "alkenyl group" refers to an unsaturated linear or branched hydrocarbon group with one or more carbon-carbon double bonds. Non-limiting examples of alkenyl groups include groups such as vinyl, 1-propenyl, 2-propenyl, 1,3-butadienyl, 1-butenyl, 2-butenyl, 1-pentenyl, 2-pentenyl, 1-hexenyl, 2-hexenyl, heptenyl, octenyl and the like. The term "alkynyl group" refers to an unsaturated linear or branched hydrocarbon group with one or more carbon-carbon triple bonds. Non-limiting examples of alkynyl groups include ethynyl, 1-propynyl, 2-propynyl, 1-butynyl, 2-butynyl, 3-butynyl, 1-pentynyl, 2-pentynyl, 1-hexynyl, 2-hexynyl, heptynyl, octynyl and the like. The term "cyclic group" refers to a closed ring hydrocarbon group that can be classified as an alicyclic group, aromatic group (aryl group), or heterocyclic group. The term "alicyclic group" refers to a cyclic hydrocarbon group having properties resembling those of aliphatic groups. Non-limiting examples of alicyclic groups include cyclopropyl, cyclobutyl, cyclopentyl, cyclohexyl, cycloheptyl, cyclooctyl and the like. The terms "aromatic group" or "aryl group" refer to a mono- or polycyclic aromatic hydrocarbon group such as phenyl or naphthyl. The term "heterocyclic group" refers to a closed ring hydrocarbon group in which one or more of the atoms in the ring is an element other than carbon (e.g., nitrogen, oxygen, sulfur, etc.).

Substitution can occur on the organic groups of the coalescents used in the coating compositions of the present invention. As a means of simplifying the discussion and recitation of certain terminology used throughout this application, the terms "group" and "moiety" are used to differentiate between chemical species that allow for substitution or that may be substituted and those that do not allow or may not be so substituted. Thus, when the term "group" is used to describe a chemical substituent, the described chemical material includes substituted and unsubstituted groups, where the substituent groups can include O, N, Si, or S atoms, for example, in the chain (e.g., an alkoxy group) as well as carbonyl groups and other conventional substituent groups. For example, the phrase "alkyl group" is intended to include not only pure open chain saturated hydrocarbon alkyl substituents, such as methyl, ethyl, propyl, t-butyl, and the like, but also includes substituted alkyl groups having substituents known in the art, such as hydroxy, alkoxy, alkylsulfonyl, halogen atoms, cyano, nitro, amino, carboxyl, and the like. Thus, "alkyl group" can include ether groups, haloalkyls, nitroalkyls, carboxyalkyls, hydroxyalkyls, sulfoalkyls, and the like. When the term "moiety" is used to describe a chemical compound or substituent, only the unsubstituted chemical material is intended to be included. Thus, the phrase "alkyl moiety" is limited to the inclusion of only pure open chain saturated hydrocarbon alkyl substituents, such as methyl, ethyl, propyl, t-butyl, and the like. The term "hydrocarbyl moiety" refer's to unsubstituted organic moieties containing only hydrogen and carbon.

In one aspect, the invention provides a coating system for a wide variety of substrates, including, for example, fiber cement substrates, such as a cement fiberboard siding product or other cement composite article. Although reference is made throughout this specification to fiber cement substrates, the coating compositions described herein may alternatively be used with a wide variety of other substrates. Suitable such other substrates include wood, metal, cement, plastic, ceramic, glass, composites, etc.

Preferably, the first coating system includes an aqueous dispersion of polymer particles (e.g., a latex polymer or polyurethane dispersion, or a mixture of both), an aliphatic epoxy resin system, optionally a silicate, and optionally one or more olefinic compounds. Alternatively, the first coating system includes: an aliphatic epoxy resin system containing an epoxy-functional latex polymer, optionally a silicate additive, and optionally one or more olefinic monomers or oligomers and initiator for same.

In preferred embodiments, the coating system has the adhesion and water-resistance properties of an epoxy system and the weathering properties of a latex or water-dispersible polymer coating.

Referring to FIG. 1, a coated article 10 of the present invention is shown in schematic cross-sectional view. Article 10 includes a cement fiberboard substrate 12. Substrate 12 typically is quite heavy and may for example have a density of about 1 to about 1.6 g/cm$^3$ or more. The first major surface 14 of substrate 12 may be embossed with small peaks or ridges 16 and valleys 18, e.g., so as to resemble roughsawn wood. Major surface 14 may have a variety of other surface configurations, and may resemble a variety of building materials other than roughsawn wood. Layer or layers 20 of the disclosed coating system lie atop and partially penetrate surface 14, and desirably are applied to article 10 at the location where article 10 is manufactured. Layer(s) 20 help to protect substrate 12 against one or more of exposure to moisture, freeze-thaw cycles, UV exposure or atmospheric carbon dioxide. Layer(s) 20 also may provide a firmly-adhered base layer upon which one or more firmly-adhered layers of final topcoat 22 may be formed. Final topcoat 22 desirably is both decorative and weather-resistant, and may be applied to article 10 at the location where article 10 is manufactured or after article 10 has been attached to a building or other surface.

A variety of cement fiberboard substrates may be employed in the disclosed articles. The disclosed substrates typically include cement and a filler. Exemplary filler's include woods, fiberglass, polymers (organic and inorganic) or mixtures thereof. The substrates can be made using methods such as, extrusion, the Hatschek method, or other methods known in the art. See, e.g., U.S. Patent Application No. 2005/0208285 A1 (corresponds to International Patent Application No. WO 2005/071179 A1); Australian Patent Application No. 2005/00347; International Patent Application No. WO 01/68547 A1; International Patent Application No. WO 98/45222 A1; U.S. Patent Application No. 2006/0288909 A1; and Australian Patent Application No. 198060655 A1. Non-limiting examples of such substrates include siding products, boards and the like, for uses including fencing, roofing, flooring, wall boards, shower boards, lap siding, vertical siding, soffit panels, trim boards, shaped edge shingle replicas and stone or stucco replicas. One or both major surfaces of the substrate may be profiled or embossed to look like a grained or roughsawn wood or other building product, or scalloped or cut to resemble shingles. The uncoated substrate surface typically contains a plurality of pores with micron- or submicron-scale cross-sectional dimensions.

A variety of suitable fiber cement substrates are commercially available. For example, several preferred fiber cement siding products are available from James Hardie Building Products Inc. of Mission Viejo, Calif., including those sold as HARDIEHOME™ siding, HARDIPANEL™ vertical siding, HARDIPLANK™ lap siding, HARDIESOFFIT™ panels, HARDITRIM™ planks and HARDISHINGLE™ siding. These products are available with an extended warranty, and are said to resist moisture damage, to require only low maintenance, to not crack, rot or delaminate, to resist damage from extended exposure to humidity, rain, snow, salt air and termites, to be non-combustible, and to offer the warmth of wood and the durability of fiber cement. Other suitable fiber cement siding substrates include AQUAPANEL™ cement board products from Knauf USG Systems GmbH & Co. KG of Iserlohn, Germany, CEMPLANK™, CEMPANEL™ and CEMTRIM™ cement board products from Cemplank of Mission Viejo, Calif.; WEATHERBOARDS™ cement board products from CertainTeed Corporation of Valley Forge, Pa.; MAXITILE™, MAXISHAKE™ AND MAXISLATE™ cement board products from MaxiTile Inc. of Carson, Calif.; BRESTONE™, CINDERSTONE™, LEDGESTONE™, NEWPORT BRICK™, SIERRA PREMIUM™ and VINTAGE BRICK™ cement board products from Nichiha U.S.A., Inc. of Norcross, Ga., EVERNICE™ cement board products from Zhangjiagang Evernice Building Materials Co., Ltd. of China and E BOARD™ cement board products from Everest Industries Ltd. of India.

In one embodiment, the present invention provides a first coating system for a cement fiberboard article. In cement fiberboard manufacturing processes, freshly coated boards exit the manufacturing line and are stacked. It is desirable to manufacture the products as efficiently as possible. Consequently, there is an ever-present desire to speed up the process or utilize less energy during the process (e.g., utilizing a smaller oven). In other words, the coatings applied to the products are preferably dried as quickly and efficiently as possible. One requirement, however, that frustrates this desire is that freshly coated boards preferably should not "block" when stacked (e.g., the coated boards should not stick together). One mechanism to lessen the tendency for a freshly applied coating to block is to use a higher Tg resin. Unfortunately, however, higher Tg resins may require the use of a coalescent solvent to facilitate film formation, and many traditional coalescent solvents are volatile and/or cause regulatory concerns. To overcome these difficulties, the disclosed compositions provide a block-resistant system that achieves proper coalescence without using a volatile reactive coalescing agent. As discussed in more detail below, it has been discovered that the combination of a high Tg latex with an aliphatic epoxy resin system gives a low-VOC coating with improved adhesion and freeze thaw performance. While not wishing to be bound by theory, it appears that the uncured epoxy resin system functions as an effective coalescent agent to the latex component.

In another embodiment, a two-component aliphatic epoxy coating system is applied to a substrate and is then overcoated with a second coating system. The use of an aliphatic epoxy system (as opposed to an aromatic epoxy system) in the first coating system permits the line to be run under conditions where the first coating system is not fully dried prior to the application of the second coating system. While not wishing to be bound by theory, it is presently believed that uncured epoxy resins may migrate into a subsequently applied coating system. The disclosed aliphatic epoxy resins, unlike most aromatic epoxy resins, do not exhibit undesirable amounts of "chalking" upon exposure to UV light. This is especially advantageous when the coated substrate is going to be exposed to sunlight for prolonged periods of time.

The term "aliphatic epoxy" means the epoxy resin is not principally derived from phenol or substituted phenol compounds (e.g., phenyl phenol, butyl phenol, nonyl phenol, cresol, bisphenol A, bisphenol F, butoxymethylolated bisphenol A, novolac phenolics, resoles phenolics, and the like). The term "aliphatic epoxy" does, however, encompass epoxy-functional latex polymers (e.g., GMA-based latex polymers), which themselves may have been formed using non-phenol-containing aromatic monomers such as styrene. Preferably, the aliphatic epoxy-functional resins will be derived from compounds having less than about 5% aromatic alcohol groups, e.g., phenol, phenyl phenol, butyl phenol, nonyl phenol, cresol, bisphenol A, bisphenol F, butoxymethylolated bisphenol A, novolac phenolics, resoles phenolics, and the like) based on the total weight of the aliphatic epoxy-functional resin. More preferably, the aliphatic epoxy-functional resins will be derived from compounds having less than about 3% aromatic alcohol groups. Most preferably, the aliphatic epoxy-functional resins will be derived from compounds having less than about 1% aromatic alcohol groups. In addition, the term "aliphatic epoxy" does encompass epoxy-functional resins made, for example, as the reaction product of an oxirane precursor molecule (e.g., epichlorohydrin) and a non-phenol-containing aromatic acids (e.g., isophthalic acid). The term "aliphatic epoxy" also encompasses epoxy resins principally derived from phenol or substituted phenols where the aromatic ring structure of the phenol or substituted phenol has been hydrogenated (e.g., hydrogenated bisphenol A).

The use of an aliphatic epoxy resin system provides yet another advantage in preferred coating systems. In another embodiment, the present invention provides 2-component aliphatic epoxy systems that function as one-coat systems. In this embodiment, a cement fiberboard product is provided that includes a first coating of an aliphatic epoxy resin system. The coating is suitable for prolonged exterior exposure such as might be experienced in advance of a field-applied topcoat. In other words, a coated cement fiberboard article is provided that exhibits acceptable weathering and freeze thaw properties. The article can be installed as received from the manufacturer and then a final coating of architectural paint can be applied. In preferred embodiments the product can withstand the elements for six months prior to the final coating being applied.

In another embodiment the coating system includes a two-part system, with a first part including a latex polymer solution, an epoxy resin dispersed in the solution and optional additives (e.g., defoamers, wetting agents, flatting agents, dyes, pigments, etc.), and a second part having an amine solution, together with optional additives (e.g., defoamers, wetting agents, flatting agents, dyes, pigments, etc.), optional silicate salt or optional additional latex polymer.

In yet another embodiment, the coating system includes a two-part system, with a first part including an epoxy-functional latex polymer solution and optional additives (e.g., defoamers, wetting agents, flatting agents, dyes, pigments, etc.), and a second part having an amine solution, together with optional additives (e.g., defoamers, wetting agents, flatting agents, dyes, pigments, etc.), optional silicate salt or optional additional latex polymer (not being epoxy-functional).

In the embodiment having two parts, the two parts are mixed to form the first coating system in a conventional manner and applied to the article, or they may be applied to the article as described in International Patent Application Serial No. PCT/US2007/002347.

The first coating system includes one or more coating compositions that may be applied in one or more layers. In certain embodiments, each of the one or more coating compositions is an aqueous composition.

In one embodiment, the first coating system includes a latex polymer and an aliphatic epoxy resin system. Examples of specific coating compositions for this embodiment include: (i) a latex polymer, and an aliphatic epoxy resin system, (ii) a latex polymer, an aliphatic epoxy resin system, and a silicate salt, (iii) a latex polymer, an aliphatic epoxy resin system, an olefinic monomer, and a silicate salt, (iv) a latex polymer, an aliphatic epoxy resin system, a silicate salt, and one or more pigments, (v) an epoxy functional latex polymer system and a silicate salt, or (vi) an epoxy functional latex polymer system, a silicate salt, and one or more pigments. In preferred embodiments, the epoxy resin system is a two-part system with a first part containing an epoxy functional resin and a second part containing a compound that is reactive with the epoxy groups (e.g., an amine compound). One exemplary coating composition, based upon non-volatile components, includes: 5-50 wt. % aliphatic epoxy resin with an epoxy equivalent weight (EEW) between 75 and 1,000; 20-80 wt. % latex polymer with a preferred Tg of 5-50° C.; 2-15 wt. % amine crosslinker with a reactive hydrogen equivalent weight between 20 and 500; and 0-40 wt. % silicate salt. Preferred 2-component systems have pot lives in excess of 2 hours at 25.6° C. (78° F.) or are applied as described in International Patent Application Serial No. PCT/US2007/002347.

The disclosed coating compositions may be used in place of or in addition to prior art "sealers", "primers", and "topcoats". However, the disclosed compositions may not fit neatly into either category per se and such terms should not be limiting.

The articles are coated on one or more surfaces with an aqueous coating system. The coating system includes one or more coating compositions that may be applied in one or more layers.

Preferred coating systems may also include one or more of the following additional features:
  low VOC;
  increasing the resistance of the article to water uptake (into the article);
  improving or promoting adhesion of additional coatings to the article surface (e.g., topcoats);
  increasing the surface integrity of the article (e.g., by acting to reinforce the fiber and cement matrix much like binder in other composite materials);
  protecting against expansion of the article under freeze/thaw conditions; or
  increasing the integrity of the edges of the article by binding the fiber layers together,
  block resistance.

Exemplary first coating systems include an aqueous dispersion of polymer particles, an aliphatic epoxy resin system, optionally a silicate salt, optionally one or more olefinic monomers or oligomers, and optional additives (e.g., defoamers, wetting agents, flatting agents, dyes, pigments, etc.).

Exemplary aqueous dispersions of polymer particles for use in the first coating systems are latex polymers, polyurethanes, polyamides, chlorinated polyolefins, acrylics, vinyls, oil-modified polymers, polyesters, and mixtures or copolymers thereof. More preferably, the aqueous dispersions of polymer particles is a latex or water-dispersible polyurethane.

In one optional embodiment, the multi-component composition may include an aqueous dispersion of polymer particles, a silicate salt, optional additives (e.g., defoamers, wetting agents, flatting agents, dyes, pigments, etc.), and optionally one or more olefinic monomers or oligomers as described in U.S. Patent Application Ser. No. 60/764,044, which is herein incorporated by reference. These additional ingredients may be added to any of the components, though it is preferred to add the aqueous dispersion of polymer particles with the epoxy component. In one embodiment, the multi-component composition, when combined, will include a latex polymer, potassium silicate, an epoxy oligomer (e.g., a hydrogenated bisphenol A containing epoxy oligomers), a polymeric amine crosslinker, and water.

A variety of polymeric materials may be employed in the disclosed aqueous dispersions of polymer particles, including (meth)acrylics, vinyls, oil-modified polymers, polyesters, polyurethanes, polyamides, chlorinated polyolefins, and mixtures or copolymers thereof. Latex polymers are readily synthesized at modest cost and provide a preferred class of aqueous dispersions of polymer particles. Latex polymers are typically prepared through chain-growth polymerization, using one or more olefinic compounds (preferably monomers). Non-limiting examples of olefinic compounds which may be used to prepare latex polymers include ethylene, butadiene, propene, butene, iso-butene, acrylic acid, methacrylic acid, methyl acrylate, ethyl acrylate, propyl acrylate, butyl acrylate, 2-ethylhexyl acrylate, methyl methacrylate, ethyl methacrylate, propyl methacrylate, butyl methacrylate, t-butyl methacrylate, 2-ethylhexyl methacrylate, hydroxyethyl acrylate, hydroxyethyl methacrylate, hydroxypropyl acrylate, hydroxybutyl acrylate, hydroxybutyl methacrylate, glycidyl methacrylate, glycidyl acrylate, 4-hydroxybutyl acrylate glycidylether, acrylamide, methylacrylamide, styrene, α-methyl styrene, t-butyl styrene, vinyl toluene, vinyl acetate, vinyl propionate, allyl methacrylate, acetoacetyl ethyl methacrylate (AAEM), diacetone acrylamide, dimethylaminomethacrylate, dimethylaminomethacrylate, N-hydroxy(meth)acrylamide, vinyl ether maleate/fumarate, vinyl esters of VERSATIC™ acid (VERSATIC acid is a synthetic saturated monocarboxylic acid of highly branched structure containing about 5 to about 10 carbon atoms), and mixtures thereof. Preferably, the latex polymer is a (meth)acrylic polymer.

The latex polymers are typically stabilized using one or more nonionic or anionic emulsifiers (viz., surfactants), used either alone or together. Examples of nonionic emulsifiers include tert-octylphenoxyethylpoly(39)-ethoxyethanol, dodecyloxypoly(10)ethoxyethanol, nonylphenoxyethyl-poly(40)ethoxyethanol, polyethylene glycol 2000 monooleate, ethoxylated castor oil, fluorinated alkyl esters and alkoxylates, polyoxyethylene (20) sorbitan monolaurate, sucrose monococoate, di(2-butyl)phenoxypoly(20)ethoxyethanol, hydroxyethylcellulosepolybutyl acrylate graft copolymer, dimethyl silicone polyalkylene oxide graft copolymer, poly(ethylene oxide)poly(butyl acrylate) block copolymer, block copolymers of propylene oxide and ethylene oxide, 2,4,7,9-tetramethyl-5-decyne-4,7-diol ethoxylated with 30 moles of ethylene oxide, N-polyoxyethylene(20)lauramide, N-lauryl-N-polyoxyethylene(3)amine and poly(10)ethylene glycol dodecyl thioether. Examples of anionic emulsifiers include sodium lauryl sulfate, sodium dodecylbenzenesulfonate, potassium stearate, sodium dioctyl sulfosuccinate, sodium dodecyldiphenyloxide disulfonate, nonylphenoxyethylpoly(1)ethoxyethyl sulfate ammonium salt, sodium styrene sulfonate, sodium dodecyl allyl sulfosuccinate, linseed oil fatty acid, sodium, potassium, or ammonium salts of phosphate esters of ethoxylated nonylphenol or tridecyl alcohol, sodium octoxynol-3-sulfonate, sodium cocoyl sarcocinate, sodium 1-alkoxy-2-hydroxypropyl sulfonate, sodium alpha-olefin ($C_{14}$-$C_{16}$) sulfonate, sulfates of hydroxyalkanols, tetrasodium N-(1,2-dicarboxy ethyl)-N-octadecylsulfosuccinamate, disodium N-octadecylsulfosuccinamate, disodium alkylamido polyethoxy sulfosuccinate, disodium ethoxylated nonylphenol half ester of sulfosuccinic acid and the sodium salt of tert-octylphenoxyethoxypoly(39)ethoxyethyl sulfate and the like. In addition, combinations of emulsifiers can be used.

If desired, the latex polymers may be stabilized with an alkali-soluble polymer. Alkali-soluble polymers may be prepared by making a polymer with acrylic or methacrylic acid or other polymerizable acid monomer (usually greater than 7%) and solubilizing the polymer by addition of ammonia or other base. See, e.g., published U.S. Patent Application Nos. 2006/0135684 A1, 2006/0135686 A1. Examples of alkali-soluble polymers include JONCRYL™ 675 and JONCRYL 678. One exemplary process for preparing alkali soluble polymers is outlined in U.S. Pat. No. 5,962,571.

Latex polymers having some acidic functionality are sometimes further stabilized by neutralization using ammonia or an amine. It has been discovered that neutralization or partial neutralization of a waterborne acetoacetyl-functional polymer with a nitrogen-containing base (e.g., ammonia or an amine) can in some situations lead to an undesirable luminescence appearance in a clear coating. Although not intended to be limiting, it is believed that this appearance may be caused by the formation of a tautomeric enol configuration or enamine configuration. The use of a nitrogen-free base (e.g., an inorganic metal base such as KOH, CaOH, NaOH, LiOH, etc.) can solve or lessen this problem for these types of coatings. Other such nitrogen-free bases may also be employed in this manner.

A water-soluble free radical initiator is typically used in the polymerization of a latex polymer. Exemplary water-soluble free radical initiators are described below. The amount of initiator is preferably from 0.01 wt. % to 3 wt. %, based on the total amount of monomer. In a redox system, the amount of reducing agent is preferably from 0.01 wt. % to 3 wt, %, based on the total amount of monomer. The reaction temperature may be in the range of 10° C. to 100° C.

Exemplary commercially available latex polymers include AIRFLEX™ EF811 (available from Air Products), EPS 2505 (available from EPS/CCA) and NEOCAR™ 2300, NEOCAR 820 and NEOCAR 2535 (available from Dow Chemical Co.). Other exemplary latex polymers include the latex polymers described in co-pending published U.S. Patent Application No. 2007/0110981 A1. Preferred latex polymers are prepared at a pH of less than about 7.5, more preferably less than about 6.0, and most preferably less than about 5.5. Preferred latex polymers are substantially free of ammonia, meaning the latex polymers contain less than about 1% ammonia on polymer nonvolatiles, more prefer ably less than about 0.3% ammonia on polymer nonvolatiles, and most preferably less than 0.1% ammonia on polymer nonvolatiles.

The latex polymer may optionally also be functionalized with olefinic groups or other crosslinkable groups where it is desired to enable the latex polymer to participate in radiation curing. Exemplary functionalized latex polymers, include ROSHIELD™ 3120 (available from Rohm & Haas) and the AAEM-functional latex polymers disclosed in U.S. patent application Ser. No. 11/300,070 filed Dec. 14, 2005 and Ser. No. 11/342,412 filed Jan. 30, 2006, and in the above-mentioned application Ser. No. 11/560,329.

Exemplary latex polymers include multistage latexes, as well as functionalized latexes (e.g., epoxy-functional latex, AAEM-functional latexes, etc.), and multistage, functionalized latexes.

Preferred single-stage latex polymers have a glass transition temperature (Tg) of at least 5° C., more preferably at least 15° C., and most preferably at least 25° C., and optimally at least 30° C. Preferred single-stage latex polymers for use have a Tg of less than 70° C., more preferably less than 60° C., and most preferably less than 50° C.

Preferred multistage latex polymers have between 50 and 90 wt. % hard segments and between 10 and 50 wt. % soft segments. The hard segment preferably has a Tg between 30 and 70° C., more preferably between 30 and 130° C. and the soft segment preferably has a Tg between 0 and 25° C.

Preferred first components having oxirane groups have a minimum film forming temperature (MFFT) less than about 30° C., more preferably less than about 20° C., and most preferably less than about 15° C. and optimally less than about 10° C., when tested with a RHOPOINT™ 1212/42, MFFT Bar-60.

The first coating composition preferably includes an aliphatic epoxy resin system. Such aliphatic epoxy resin systems may include multi-functional epoxy resins (e.g., di-, tri-, tetra-, and other multi-functional epoxy resins) that are built using aliphatic components. Examples of such multi-functional epoxy resins include the reaction products of epoxy containing compounds (e.g., epichlorohydrin) with multi-functional aliphatic alcohols or acids.

According to one embodiment, an epoxy coating system is applied to the fiber cement substrate. The epoxy coating system is typically a multi-component coating system that includes the epoxy coating systems include those described in International Patent Application Serial No. PCT/US2007/002347. Epoxy-based coatings include multi-functional epoxy-functional coatings, e.g., resins (e.g., di-, tri-, tetra-, and other multi-functional epoxy resins) that are prepared from aliphatic or aromatic starting materials. Aliphatic starting materials are presently preferred in cases where the starting material might be exposed for prolonged periods to UV radiation. Examples of such multi-functional epoxy resins include the reaction products of epoxy containing compounds (e.g., epichlorohydrin) with multi-functional alcohols or acids. Another class of aliphatic epoxies is derived from oxidized olefins, such as limonene dioxide, epoxidized oils and the like.

In another embodiment, an epoxy resin can be prepared by reacting the required proportions of an aliphatic polyol compound with an oxirane precursor molecule (e.g., epichlorohydrin). Procedures for such reactions are generally known in the art and disclosed, for example, in U.S. Pat. No. 2,633,458. For example, epichlorohydrin may be reacted with the following exemplary alcohol containing materials or carboxylic acid containing materials (or mixtures of such materials) to form an epoxy resin: ethylene glycol, propylene glycol, 1,3-propanediol, 1,4-butanediol, 1,3-butanediol, 2-methyl-1,3-propanediol, neopentyl glycol, 2,2-butylethyl propanediol, hexanediol, diethylene glycol, dipropylene glycol, polyethylene glycols, polypropylene glycols, cyclohexane dimethylol, 2,2,3-trimethylpentanediol, trimethyol propane ("TMP"), ethoxylated TMP, propoxylated TMP, glycerine, propoxylated glycerine, pentaerythritol, ethoxylated pentaerythritol, propoxylated pentaerythritol, dipentaerythritol, tripentaerythritol, ethoxylated and propoxylated di and tri-pentaerythritol, ditrimethylolpropane, hydroxypivalyl hydroxypivalate, hydrogenated bisphenol A, ethoxylated and propoxylated hydrogenated bisphenol A, isosorbide, malonic acid, succinic acid, glutaric acid, sebacic acid, fumaric acid, adipic acid, pimelic acid, hexahydrophthalic acid, 1,3- and 1,4 cyclohexanedicarboxylic acid, orthophthalic acid, isophthalic acid, maleic acid, chlorendic acid, glycolic acid, citric acid, trimellitic acid, lactic acid, caprolactone and the like. Other alcohols or acids may be used as well. Preferred alcohols include, neopentyl glycol, trimethylolpropane, and hydrogenated bisphenol A.

Preferred epoxy resins distinct from the aqueous dispersion of polymer particles are characterized by a molecular structure that includes at least one oxirane chemical group. The epoxy resins may be a low molecular weight molecule (e.g., having a weight average molecular weight less than about 1000 Daltons), or may be in the form of a higher molecular weight molecule (e.g., having a weight average molecular weight greater than about 1000 Daltons). Preferred epoxy resins have a molecular weight between 200 and 25,000, more preferably between 200 and 10,000, and most preferably between 200 and 2,000 Daltons. Preferred epoxy resins have an epoxy equivalent weight (EEW) of EEW of between about 75 and 1,000, more preferably between about 85 and 800, and most preferably between about 90 and 350, and optimally between 90-250 gm/epoxy group. Preferred aliphatic epoxy resins have a functionality of between about 1 and 5, more preferably between about 1.5 and 4, and most preferably between about 2 and 3.5. In some embodiments, the epoxy resin has a plurality of oxirane groups and is capable of functioning as a cross-linker. In this embodiment, the epoxy functional polymer could crosslink with the amine present in the two-component epoxy.

First coating compositions preferably include at least about 2 wt %, more preferably include at least about 3 wt % and most preferably include at least about 4 wt % aliphatic epoxy resin based upon total weight solids of the epoxy coating system. First coating compositions also preferably include less than about 40 wt %, more preferably include less than about 30 wt % and most preferably include less than about 15 wt % aliphatic epoxy resin based upon total weight solids of the epoxy coating system.

The epoxy resin can be reacted or crosslinked with an active hydrogen compound, such as amines, acids, acetoacetyl, hydroxyl, etc. Exemplary amines include amidoamines such as the EPIKURE™ 3000 series from Hexion, polyamines such as the EPIKURE 3100 series from Hexion, aliphatic and modified aliphatic amines such as the EPIKURE 3200 series from Hexion, cycloaliphatic amines such as the EPIKURE 3300 series from Hexion, waterborne/water dispersed amines such as EPIKURE 6870, 8290, 8535, 8536, 8537 and 8540 from Hexion, dicyandiamides such as the Omnicure DDA series from CVC Specialty Chemicals, polyoxyalkyleneamines such as the JEFFAMINE™ series (M, D, ED, EDR, T, SD, ST, HK, and XTJ) from Huntsman, amino functional phenolic resins (e.g. benzoguanamine) as well as other monomeric amines such as isophorone diamine, piperazine, and the like.

The ratio of epoxy functionality to active hydrogen functionality (e.g., amino-functionality) is generally controlled by the equivalent weight and mixing weight ratio of each component. Substrate morphology and porosity and the desired application viscosity determine the desired optimal ratio. Moreover, the epoxy-functional and active hydrogen-functional components may be applied at differing percent solids (percent non-volatile material) or differing wet film thicknesses to obtain the desired mixing weight ratio. Preferably, the epoxy resin system has an oxirane group to active hydrogen group ratio of less than about 6:1, more preferably less than about 4:1 and most preferably less than about 2:1, and optimally less than about 1.4:1. Preferably, the epoxy resin system has an oxirane group to active hydrogen group ratio of greater than about 1:2, more preferably greater than about 1:1.5, most preferably greater than about 1:1.2 and optimally greater than 1:1.1. In a preferred embodiment, the epoxy resin system has an oxirane group to active hydrogen group ratio of about 1:1.

In one embodiment, the aliphatic epoxy resin is incorporated into a latex polymer. For example, the epoxy resin-latex polymer blend can be prepared by (i) adding the epoxy resin directly to the latex polymer and mixing, (ii) mixing a pre-emulsified epoxy with the latex polymer, (iii) adding the epoxy resin to the latex monomer feed during the latex synthesis, or (iv) mixing the epoxy resin and the latex polymer in a static mixer and combining the mixture with a second component containing an amine crosslinker, and applying to an article. The epoxy can also be applied by any of the methods outlined in International Patent Application Serial No. PCT/US2007/002347.

Preferably, the aliphatic epoxy resin is added directly to the latex polymer to form a first component of the epoxy coating system. The active hydrogen compound (e.g., the amine component) is provided in a separate component of the epoxy coating system. By adding the aliphatic epoxy directly to the latex one can avoid the step of preparing a separate epoxy resin dispersion.

Epoxy-functional latex polymers may also be used. When the latex polymer is formed using an epoxy functional monomer (such as glycidyl methacrylate, GMA) the epoxy functional monomer is preferably added to the reaction vessel during the final portion of the monomer addition. Preferably, the epoxy-functional monomer is added during the last 50% of the monomer addition, more preferably, the epoxy-functional monomer is added during the last 35% of the monomer addition, and most preferably the epoxy-functional monomer is added during the last 20% of the monomer addition. It is believed that by adding the epoxy-functional monomer late in the reaction, the epoxy groups become incorporated into the polymer particle in a better position to subsequently react with the epoxide-reactive functional groups (amine component).

It may also be advantageous to use a gradient latex polymer, which could contain various levels of the epoxy-functional monomer throughout the polymer make up. For example, one may start with a monomer composition substantially free or exempt of epoxy-functional monomer and then at a certain point in the polymerization start to feed a monomer composition containing epoxy-functional monomer into the low or exempt epoxy-functional monomer feed. The resulting latex polymer can have a gradient of epoxy functionality from low in the center of the polymer particle to high on the surface of the polymer particle where it is believed that it would be in a better position to react with the epoxy-reactive functional groups.

Epoxy functional latex polymers preferably have an epoxy equivalent weight less than about 15,000, more preferably less than about 7,000, and most preferably less than about 4,000 based on the total weight of the latex polymer solids. Epoxy functional latex polymers preferably have an epoxy equivalent weight greater than about 450, more preferably greater than about 1,000, and most preferably greater than about 1,600 based on the total weight of the latex polymer solids.

In certain embodiments, one or both of the epoxide-reactive functional groups (e.g., amino-functional chemical compound) and the epoxy-functional coating composition (oxirane-functional chemical compound) may be chemically blocked to delay onset of chemical reaction until a desired time, at which time a stimulus is used to de-block the components and permit reaction. For example, amine groups may be blocked to form a ketimene, which can unblock in the presence of moisture. The blocked component may be heated to facilitate unblocking.

Preferred amino-functional chemical compounds are characterized by a molecular structure which includes at least one chemical group such as >NH or —NH$_2$. The amino-functional chemical compound may be a low molecular weight molecule (e.g., having a weight average molecular weight less than about 1000 Daltons), or may be in a higher molecular weight molecule (e.g., having a weight average molecular weight greater than about 1000 Daltons). Preferred amino-functional compounds have a molecular weight between 100 and 30,000 Daltons, more preferably between 200 and 10,000. Preferred amino-functional compounds have an amine equivalent weight of between 20 and 1500, more preferably between 20 and 750, and most preferably between 20 and 300 gm/amine group. In some embodiments, the amino-functional chemical compound has a plurality of amino groups and is capable of functioning as a cross-linker.

The disclosed coating systems may include one or more optional water-soluble silicate salts. Visual observation of coating compositions containing such silicate salts indicated that inclusion of the silicate salt led to improved absorption of the coating composition into cement fiberboard substrates. Examples of silicate salts include lithium silicate, potassium silicate, sodium silicate, ammonium silicate and the like. In preferred embodiments, the amount of silicate salt is from about 2 to about 50% by weight, more preferably from about 5 to about 40% by weight and most preferably from about 10 to about 35% by weight, based on the total weight of the non-volatile components. Silicate salts are available through a variety of chemical suppliers. For example, sodium silicate (sometimes referred to as waterglass) is available in a variety of forms including sodium orthosilicate ($Na_4SiO_4$), sodium metasilicate ($Na_2SiO_3$), sodium polysilicate (($Na_2SiO_3)_n$) and sodium pyrosilicate ($Na_6Si_2O_7$). Sodium silicate and potassium silicate (sometimes referred to as potassium waterglass) are available from PQ Corporation, Valley Forge, Pa.

A variety of olefinic compounds may be used in the disclosed coating systems. The olefinic compounds are carbon-containing compounds having at least one site of unsaturation which can react, optionally in the presence of an initiator, to provide polymeric or crosslinked products. Non-limiting examples of olefinic compounds include monomers such as (meth)acrylates, vinyls, vinyl ethers, allyl ethers, vinyl esters, unsaturated oils (including mono-, di- and tri-glycerides), unsaturated fatty acids, and the like or mixtures thereof. The olefinic compounds also include oligomers or polymers having at least one site of unsaturation which can react, optionally in the presence of an initiator, to provide polymeric or crosslinked products.

Exemplary olefinic monomers include (meth)acrylate esters of unsubstituted or substituted $C_1$-$C_{15}$ alcohols such as tripropylene glycol, isobornyl alcohol, isodecyl alcohol, phenoxyethyl alcohol, tris-hydroxyethyl isocyanurate, trimethylolpropane ethoxylate, ditrimethylolpropane ethoxylate, hexanediol, ethoxylated neopentyl glycol, propoxylated neopentyl glycol, ethoxylated phenol, polyethylene glycol, bisphenol A ethoxylate, trimethylolpropane, propoxylated glycerol, pentaerythritol, tetrahydrofurfuryl alcohol, β-carboxyethyl alcohol, or combination thereof. For example, the olefinic monomer may be isobornyl (meth)acrylate, isodecyl (meth)acrylate, phenoxyethyl (meth)acrylate, trimethylolpropane tri(meth)acrylate, alkoxylated cyclohexane dimethanol di(meth)acrylate, trimethylolpropane ethoxylate tri (meth)acrylate, dipropylene glycol di(meth)acrylate, tripropylene glycol di(meth)acrylate, hexanediol di(meth)acrylate, tetrahydrofurfuryl (meth)acrylate, pentaerythritol tri(meth)acrylate, pentaerythritol tetra(meth)acrylate, dipentaerythritol hexa(meth)acrylate, di-(trimethylolpropane tetra (meth)acrylate), propoxylated glycerol tri(meth)acrylate, beta-carboxyethyl (meth)acrylate, bisphenol A ethoxylate di(meth)acrylate, ethoxylated neopentyl glycol di(meth) acrylate, propoxylated neopentyl glycol di(meth)acrylate, di-(trimethylolpropane tetra(meth)acrylate) or combination thereof. Preferred olefinic monomers include trimethylolpropane tri(meth)acrylate, bisphenol A ethoxylate di(meth)acrylate, propoxylated glycerol tri(meth)acrylate, trimethylolpropane ethoxylate tri(meth)acrylate, di-(trimethylolpropane tetra(meth)acrylate), or combinations thereof. The olefinic monomer may contain a ($C_1$-$C_{15}$) alcohol radical such as hydroxymethyl, 1-hydroxyethyl, 2-hydroxyethyl, 1-hydroxypropyl, 2-hydroxypropyl, 3-hydroxypropyl, 1-hydroxybutyl, 4-hydroxybutyl, 1-hydroxypentyl, 5-hydroxypentyl, 1-hydroxyhexyl, 6-hydroxyhexyl, 1,6-dihydroxyhexyl, 1,4-dihydroxybutyl, and the like.

Exemplary allyl ether monomers contain one or more allyl ether groups which typically are bonded to a core structural group which can be based on a wide variety of polyhydric alcohols. Non-limiting examples of polyhydric alcohols include neopentyl glycol, trimethylolpropane, ethylene glycol, propylene glycol, butylene glycol, diethylene glycol, trimethylene glycol, triethylene glycol, trimethylolethane, pentaerythritol, dipentaerythritol, di-trimethylolpropane, glycerol, propoxylated glycerol, diglycerol, 1,4-butanediol, 1,6-hexanediol, 1,4-cyclohexanedimethanol, and any of the other polyols mentioned above in connection with the (meth) acrylate esters. Other exemplary allyl ether monomers include hydroxyethyl allyl ether, hydroxypropyl allyl ether, trimethylolpropane monoallyl ether, trimethylolpropane diallyl ether, trimethylolethane monoallyl ether, trimethylolethane diallyl ether, glycerol monoallyl ether, glycerol diallyl ether, pentaerythritol monoallyl ether, pentaerythritol diallyl ether, pentaerythritol triallyl ether, 1,2,6-hexanetriol monoallyl ether, 1,2,6-hexanetriol diallyl ether, and the like. Preferred allyl ethers include poly propoxylated and ethoxylated forms of allyl ethers.

Exemplary vinyl ether monomers contain one or more vinyl ether groups and include 4-hydroxybutyl vinyl ether, 1,4-cyclohexanedimethanol monovinyl ether, 1,4-cyclohexanedimethanol divinyl ether, ethylene glycol monovinyl ether, ethylene glycol divinyl ether, diethylene glycol monovinyl ether, diethylene glycol divinyl ether, triethylene glycol divinyl ether, and the like. Preferred vinyl ether monomers include propoxylated or ethoxylated forms of vinyl ether monomers.

The olefinic compounds are curable by radiation, e.g., visible light, ultra violet light, electron beam, and the like. An initiator system is not required for electron beam curing but for other radiation sources typically will be chosen based on the particular type of curing energy (e.g., UV, visible light or other energy) and curing mechanism (e.g., free-radical, cationic or other curing mechanism) employed. Thus, in one preferred embodiment, the coating system is electron beam curable and does not require an initiator. In another preferred embodiment, the coating system is UV curable and free-radically polymerizable, and includes a UV photoinitiator system which generates free radicals in response to UV light and thereby cures the coating. Exemplary photoinitiator's, coinitiator's or synergists are disclosed in U.S. patent application Ser. No. 11/342,412.

The disclosed coating systems or coating compositions preferably contain about 2 to about 50% by weight separate olefinic compounds based on the total weight of the non-volatile components in the coating system, more preferably about 5 to about 40% by weight and most preferably about 10 to about 35% by weight.

Other optional components for use in the coating systems herein are described in Koleske et al., Paint and Coatings Industry, April, 2003, pages 12-86. Typical performance enhancing additives that may be employed include surface active agents, pigments, colorants, dyes, surfactants, dispersants, defoamers, thickeners, heat stabilizers, leveling agents, coalescents, biocides, mildewcides, anti-cratering agents, curing indicators, plasticizers, fillers, sedimentation inhibitors, ultraviolet light absorbers, optical brighteners, and the like to modify properties.

The first coating composition is preferably applied to the substrate at a dry film weight of between about 6 and 60 gm/$m^2$, more preferably between about 4 and 45 gm/$m^2$, and most preferably between about 3 and 30 gm/$m^2$. A recommended thickness of the first coating system after it is dried or otherwise hardened is about 2 to about 75 micrometers and more preferably about 3 to about 30 micrometers, most preferably about 3 to about 20 micrometers, and optimally about 4 to about 13 micrometers.

Exemplary coating compositions that can be used in the first coating systems are listed below. Exemplary coating compositions may also contain optional additives (e.g., defoamers, wetting agents, flatting agents, dyes, pigments, etc.) This is not intended to be an exhaustive list of examples of aqueous based coating compositions. The examples include compositions having the following major ingredients:

A Latex polymer and aliphatic epoxy resin system;
B Latex polymer, aliphatic epoxy resin system, and silicate salt;
C Epoxy-functional latex system;
D Epoxy-functional latex system and silicate salt; and
E Epoxy-functional latex system, aliphatic epoxy resin, and silicate salt.

Compositions A2 to C2—The aforementioned exemplary coating compositions may further include one or more optional olefinic compounds and an initiator. Exemplary olefinic compounds include those described above, as well as multi-functional olefinic compounds (e.g., di- and tri- and tetra-functional (meth)acrylates). Preferred such olefinic monomers include trimethylolpropane tri-acrylate (TMPTA), di-trimethylolpropane tetra-acrylate (di-TMPTA) (both available from Sartomer), propoxylated glycerine triacrylate (available from Sartomer as SR 9020 and SR 9021), the methacrylate versions of these, mixtures thereof, and the like. Exemplary initiators include redox, thermal, or radiation activated initiators such as photoinitiators, Among photoinitiators suitable for use in the present invention with resins having (meth)acrylate or allyl ether functional groups are alpha-cleavage type photoinitiators and hydrogen abstraction type photoinitiators. The photoinitiator may include other agents such as a coinitiator or photoinitiator synergist that aid the photochemical initiation reaction. Suitable cleavage type photoinitiators include alpha, alpha-diethoxyacetophenone (DEAP), dimethoxyphenylacetophenone (commercially available under the trade designation IRGACURE™ 651 from Ciba Corp., Ardsley, N.Y.), hydroxycyclo-hexylphenylketone (commercially available under the trade designation IRGACURE 184 from Ciba Corp.), 2-hydroxy-2-methyl-1-phenylpropan-1-one (commercially available under the trade designation DAROCUR™ 1173 from Ciba Corp.), a 25:75 blend of bis-(2,6-dimethoxybenzoyl)-2,4,4-trimethylpentyl phosphine oxide and 2-hydroxy-2-methyl-1-phenyl-propan-1-one (commercially available under the trade designation IRGACURE 1700 from Ciba Corp.), a 50:50 blend of 2-hydroxy-2-methyl-1-phenylpropan-1-one and 2,4,6-trimethylbenzoyl-diphenylphosphine oxide (TPO, commercially available under the trade designation DAROCUR 4265 from Ciba Corp.), phosphine oxide, 2,4,6-trimethyl benzoyl (commercially available under the trade name IRGACURE 819 and IRGACURE 819DW from Ciba Corp.), 2,4,6-trimethyl-benzoyl-diphenylphosphine oxide (commercially available under the trade designation LUCIRIN from BASF Corp., Mount Olive, N.J.), and a mixture of 70% oligo 2-hydroxy-2-methyl-4-(1-methylvinyl)phenylpropan-1-one and 30% 2-hydroxy-2-methyl-1-phenylpropan-1-one) (commercially available under the trade designation KIP 100 from Sartomer, Exton, Pa.). Suitable hydrogen abstraction-type photoinitiators include benzophenone, substituted benzophenones (such as that commercially available under the trade designation ESCACURE TZT from Fratelli-Lamberti, sold by Sartomer, Exton, Pa.), and other diaryl ketones such as xanthones, thioxanthones, Michler's ketone, benzil, quinones, and substituted derivatives of all of the above. Preferred photoinitiators include DAROCUR 1173, KIP 100, benzophenone, and IRGACURE 184. A particularly preferred initiator mixture is commercially available under the trade designation IRGACURE 500 from Ciba Corp., which is a mixture of IRGACURE 184 and benzophenone, in a 1:1 ratio. This is a good example of a mixture of an alpha-cleavage type photoinitiator and a hydrogen abstraction-type photoinitiator. Other mixtures of photoinitiators may also be used in the coating compositions of the present invention. Camphorquinone is one example of a suitable photoinitiator for curing a coating composition with visible light.

The first coating system can be applied as a single coating composition or as multiple applications of more than one coating compositions. In a preferred embodiment, the composition is provided as a two-part composition and the components are either mixed prior to use or applied according to the methods described in International Patent Application Serial No. PCT/US2007/002347. The specific application and order of application of the selected coating compositions can be readily determined by a person skilled in the art. Exemplary descriptions of these aqueous based coating systems are described below.

An example of a first coating system for preparing a coated article includes water, a latex polymer, an aliphatic epoxy resin system, optionally a silicate salt, optional additives (e.g., defoamers, wetting agents, flatting agents, dyes, pigments, etc.), and optionally one or more olefinic monomers and an initiator. The coated substrate may then be coated with a second coating system (e.g., a primer or topcoat composition).

Specific application routes for preparing the coated articles include:

1) Apply a first coating composition and dry to remove at least a portion of the water, and optionally subject the first coating system to a UV cure;
2) Apply a first coating composition, apply one or more additional first coating composition(s) or one or more second coating system(s), and dry to remove at least a portion of the water, and optionally subject the entire coating system to UV cure; and
3) Apply a first coating composition and dry to remove at least a portion of the water, apply one or more additional first coating composition(s) and/or one or more second coating system(s) and dry to remove at least a portion of the water, and optionally subject the entire coating system to UV cure.

Accordingly, coated articles can be prepared by applying the first coating system as a single coating composition or the first coating system can be applied as multiple compositions. It is also possible to apply multiple layers of the first coating systems. In first coating systems using multiple coating compositions or layers of such compositions, (i) the applied coating composition(s) can be dried (to remove at least a portion of the water (solvent)) prior to curing and/or addition of one or more additional coating compositions, or (ii) the coating composition(s) can be applied prior to drying the previously applied coating composition(s), thus allowing the coating compositions to mix at an interface.

The disclosed coating composition(s) are preferably applied at about 5 to 60% solids by weight based on the total weight of the non-volatile components, more preferably at about 10 to 50% solids, and most preferably at about 10 to 40% solids.

If desired, a second coating system (e.g., a topcoat or a primer and a topcoat) may be applied to the first coating system. Preferred second coating systems may be formulated using (i) functionalized latex polymer's such as are described herein and in published U.S. Patent Application Nos. 2006/0135684 A1, 2006/0135686 A1, which are herein incorporated by reference; (ii) "multistage" latex polymers; and (iii) functionalized "multistage" latex polymers, such as are described herein and in published U.S. Patent Application No. 2007/0110981 A1, Functionalized latex polymers, if used, preferably contain one or more acetoacetyl groups, carboxylic acid groups, amine groups, epoxy groups, hydroxyl groups, and combinations there of.

Primers may include pigments or be applied as a clear coating. In one embodiment, the primer can be formulated using low cost extender pigments at a high PVC level (e.g., greater than 45% pigment). This type of system can have an advantageous overall cost, e.g., when the extender pigments are lower cost than the binder. In another embodiment, the primer can be formulated as a clear coating or as a low PVC level coating (e.g., a coating preferably having less than about 15% PCV). In a preferred embodiment, the applied dry or otherwise hardened film thickness of the primer is about 2 to about 75 micrometers, more preferably about 3 to about 30 micrometers, most preferably about 3 to about 20 micrometers, and optimally about 4 to about 13 micrometers.

In one preferred embodiment, the coating composition(s) contain a functionalized latex polymer that incorporates acetoacetyl functionality. Acetoacetyl functionality may be incorporated into the polymer through the use of: acetoacetoxyethyl acrylate, acetoacetoxypropyl methacrylate, allyl acetoacetate, acetoacetoxybutyl methacrylate, 2,3-di(acetoacetoxy)propyl methacrylate, 2-(acetoacetoxy)ethyl methacrylate, t-butyl acetoacetate, diketene, and the like, or combinations thereof. In certain embodiments, the acetoacetyl functional latex polymer is preferably prepared through chain-growth polymerization, using, for example, 2-(acetoacetoxy)ethyl methacrylate (AAEM). Preferred latex polymers include at least 0.5 weight % acetoacetyl functionality based on the total weight of the latex polymer, more preferably 0.5 to 5 weight % acetoacetyl functionality based on the total weight of the latex polymer, and most preferably about 1 to 4 weight % acetoacetyl functionality based on the total weight of the latex polymer. Such functionalized latex polymers are described in U.S. patent application Ser. Nos. 11/300,070 and 11/342,412. In general, any polymerizable hydroxy functional or other active hydrogen containing monomer can be converted to the corresponding acetoacetyl functional monomer by reaction with diketene or other suitable acetoacetylating agent (see, e.g., Comparison of Methods for the Preparation of Acetoacetylated Coating Resins, Witzeman, J. S.; Dell Nottingham, W.; Del Rector, F. J. Coatings Technology; Vol, 62, 1990, 101 (and references contained therein)). In preferred coating compositions, the acetoacetyl functional group is incorporated into the polymer via 2-(acetoacetoxy)ethyl methacrylate, t-butyl acetoacetate, diketene, or combinations thereof.

The functionalized latex polymer can be prepared through chain-growth polymerization, using one or more olefinic monomers such as are described above for the first coating system.

If desired, the functionalized latex polymer may be a multistage latex polymer. Exemplary multistage latex polymer compositions contain at least two polymers of different glass transition temperatures (e.g., different Tg's) and may be prepared via emulsion polymerization using many of the aforementioned monomers. In one preferred embodiment, the latex will include a first polymer stage (the "soft stage") having a Tg between about −65 and 30° C., more preferably between about −5 and 25° C., and a second polymer stage (the "hard stage") having a Tg between about 30 and 230° C., more preferably between about 30 and 105° C. Multistage latexes are typically produced by sequential monomer feeding techniques. For example, a first monomer composition is fed during the early stages of the polymerization, and then a second different monomer composition is fed during the later stages of the polymerization. In certain embodiments, it may be favorable to start the polymerization with a high Tg monomer composition and then switch to a low Tg monomer composition, while in other embodiments, it may be favorable to start the polymerization with a low Tg monomer composition and then switch to a high Tg monomer composition.

Numerous hard and soft stages may also be utilized. For example, in certain compositions it may be beneficial to polymerize two different low Tg soft stage monomer compositions after the hard stage polymer is formed. The first soft stage may be a prepared with a monomer composition Tg close to room temperature (e.g., 20° C.) and the second soft stage may be prepared with monomer composition Tg well below room temperature (e.g., less than 5° C.). While not intending to be bound by theory, it is believed that this second soft stage polymer assists with improving coalescence of the latex polymer particles.

It may also be advantageous to use a gradient Tg latex polymer, which would contain an almost infinite number of Tg stages. For example, one may start with a high Tg monomer composition and then at a certain point in the polymerization start to feed the low Tg soft stage monomer composition into the high Tg hard stage monomer feed. The resulting multistage latex polymer will have a gradient Tg from high to low. A "power feed" process may be used to prepare such compositions. A gradient Tg polymer may also be used in conjunction with multiple multistage Tg polymers. As an example, one may prepare a high Tg monomer feed (F1) and a low Tg monomer feed (F2). One would begin to feed F1 into the latex reactor vessel and initiate polymerization. At a certain period during the F1 feed, one would then feed F2 into F1 wherein the F2 feed rate is faster than the overall feed rate of F1+F2 into the reactor vessel. Consequently, once the F2 feed into F1 is complete, the overall Tg of the F1+F2 monomer feed blend will be a lower Tg "soft stage" monomer composition.

Multistage latex polymer compositions preferably include about 5 to 95 weight % soft stage polymer morphology on total polymer weight, more preferably about 50 to 90 weight % soft stage polymer morphology on total polymer weight, and most preferably about 60 to 80 weight % soft stage polymer morphology on total polymer weight.

Multistage latex polymer compositions preferably include about 5 to 95 weight % hard stage polymer morphology on total polymer weight, more preferably about 10 to 50 weight % hard stage polymer morphology on total polymer weight, and most preferably about 20 to 40 weight % hard stage polymer morphology on total polymer weight.

The multistage latex polymer compositions preferably include at least about 10 wt. %, more preferably at least about 25 wt. %, and yet more preferably at least about 35 wt. % multistage latex polymer based on the total composition solids. Exemplary topcoat compositions also preferably include less than 100 wt. %, more preferably less than about 85 wt. %, and yet more preferably less than about 80 wt. % multistage latex polymer, based on the total composition solids.

The multistage latex polymer is preferably prepared through chain-growth polymerization, using one or more ethylenically unsaturated monomers as mentioned above. The ratios of the monomers may be adjusted to provide the desired level of "hard" or "soft" segments. In general, the Fox equation may be employed to calculate the theoretical Tg of the monomer composition being fed. For example, a soft segment may be introduced by providing a monomer composition containing 5 to 65 parts butyl acrylate, 20 to 90 parts butyl methacrylate, 0 to 55 parts methyl methacrylate, 0 to 5 parts (meth)acrylic acid and 0 to 20 parts AAEM. In contrast, a hard segment may be introduced by providing a monomer composition containing 0 to 20 parts butyl acrylate, 0 to 40 parts butyl methacrylate, 45 to 95 parts methyl methacrylate, 0 to 5 parts (meth)acrylic acid and 0 to 20 parts AAEM. The aforementioned compositions are illustrative of this concept and other compositions can be used in the practice of this invention. A preferred embodiment would contain at least 15 weight % butyl methacrylate based upon total latex polymer solids.

The functionalized multistage latex polymer preferably incorporates acetoacetyl functionality, which may be incorporated into the multistage polymer as described above.

The functionalized latex polymers described above (whether single stage or multistage) may be stabilized by one or more nonionic or anionic emulsifiers (e.g., surfactants), used either alone or together as was described above.

The multistage latex polymer may also be prepared with a high Tg alkali-soluble polymer hard stage. Alkali-soluble polymer's may be prepared by making a polymer with acrylic or methacrylic acid or other polymerizable acid monomer (usually greater than 10%) and solubilizing the polymer by addition of ammonia or other base. Examples of alkali-soluble support polymers are JONCRYL 675 and JONCRYL 678. A low Tg soft stage monomer composition could then be polymerized in the presence of the hard stage alkali-soluble polymer to prepare a multistage latex polymer. A water-soluble free radical initiator is typically used in the chain growth polymerization of the functionalized latex polymer.

First and second coating compositions may also contain an optional coalescent and many coalescents are known in the art. The optional coalescent is preferably a low VOC coalescent such as is described in U.S. Pat. No. 6,762,230. The coating compositions preferably include a low VOC coalescent in an amount of at least about 0.5 weight %, more preferably at least about 0.75 weight %, and yet more preferably at least about 1.0 weight % based upon total compositional solids. The coating compositions also preferably include a low VOC coalescent in an amount of less than about 20 weight %, more preferably less than about 17 weight %, and yet more preferably less than about 15 weight %, based upon total compositional solids.

For some applications, a coating that is opaque, colored, pigmented or has other visual characteristics is desired. Agents to provide such properties can also be included in the coating compositions, Pigments for use with the disclosed coating compositions are known in the art. Exemplary pigments include titanium dioxide white, carbon black, lampblack, black iron oxide, red iron oxide, yellow iron oxide, brown iron oxide (a blend of red and yellow oxide with black), phthalocyanine green, phthalocyanine blue, organic reds (such as naphthol red, quinacridone red and toulidine red), quinacridone magenta, quinacridone violet, DNA orange, or organic yellows (such as Hansa yellow). The composition can also include a gloss control additive or an optical brightener, such as that commercially available under the trade designation UVITEX OB from Ciba-Geigy.

Certain embodiments can include fillers or inert ingredients in the coating composition. Fillers and inert ingredients include, for example, clay, glass beads, calcium carbonate, talc, silicas, organic fillers, and the like. Fillers extend, lower the cost of, alter the appearance of, or provide desirable characteristics to the composition before and after curing. Exemplary fillers are known to those of skill in the art or can be determined using standard methods. Fillers or inert ingredients are preferably present in an amount of at least 0.1 weight %, based on the total weight of the coating composition. Fillers or inert ingredients are preferably present in an amount of no greater than 40 weight %, based on the total weight of the coating composition.

The disclosed coating systems may also include other ingredients that modify properties of the curable coating composition as it is stored, handled, or applied, and at other or subsequent stages. Waxes, flatting agents, mar and abrasion additives, and other similar performance enhancing additives may be employed as required in amounts effective to upgrade the performance of the cured coating and the coating composition. Desirable performance characteristics of the coating include chemical resistance, abrasion resistance, hardness, gloss, reflectivity, appearance, or combinations of these characteristics, and other similar characteristics.

The coating systems may be applied by any number of application techniques including but not limited to brushing (e.g., using a brush coater), direct roll coating, reverse roll coating, mist coating, flood coating, vacuum coating, curtain coating and spraying. The various techniques each offer a unique set of advantages and disadvantages depending upon the substrate profile, morphology and tolerable application efficiencies. Lower viscosities facilitate uniform film control. The applied film thickness may be controlled, for example, by varying the application rate.

It is preferred that the coated articles are coated on at least one major surface with the epoxy coating system. More preferably, the coated articles are coated on a major surface and up to four minor surfaces including any edges. Most preferably, the coated articles are coated on all (e.g., both) major surfaces, and up to four minor surfaces including any edges.

A topcoat or primer and topcoat may be applied directly to the epoxy coating system. The coating systems and coating compositions described herein may be used in place of or in addition to coatings that the prior art has categorized as "sealers," "primers" and "topcoats." However, the systems and compositions may not fit neatly into any category per se and such terms should not be limiting. A preferred thickness for the dried or otherwise hardened topcoat is between about 20 and about 200 micrometers, preferably between about 25 and about 120 micrometers, more preferably between about 30 and about 100 micrometers, and most preferably between about 35 and about 75 micrometers.

Wet adhesion testing and "freeze-thaw" cycles have been shown, under laboratory conditions, to simulate long-term outdoor exposure encountered in northern climates. A Wet Adhesion Test may be carried out as follows to evaluate adhesion of the coating system after a coated cement fiberboard substrate has been saturated with water. According to this test procedure, coated substrates (e.g., fiber cement boards) are soaked in room temperature water for 24 hours. After soaking, the boards are removed from the water and kept at room temperature for 24 hours. A six-inch (15.24 cm) length of 3M HD 250 tape is applied to the surface of the board with the long axis of the tape in the direction of any embossing patterns that may be present. The tape is firmly pressed onto the board ensuring full contact. The tape is then removed by quickly pulling it off at a 90-degree angle to the board. "Wet Adhesion" performance is rated based on the percent of coating removed from the cement board. Performance is further assessed by noting where any failure occurs. For example, failure may occur between interfacial coating layers, between the coating and the surface of the board, or within the board itself. Preferred coating systems or coating compositions typically have less than 25% coating removal, more preferably less than 15% coating removal. In addition, the failure preferably is within the board as indicated by a significant amount of fiber from the board adhering to the removed coating.

Preferred coated articles can withstand at least 30 freeze-thaw cycles, when tested according to ASTM D6944-03, Test Method A. As written, this ASTM test method recites a 30-cycle sequence. However, rather than simply grade a specimen as a "pass" at the end of 30 cycles, the test desirably is lengthened to include additional cycles. More preferably, the coated articles can withstand at least 75 freeze-thaw cycles, most preferably at least 125 freeze-thaw cycles and optimally at least 175 freeze-thaw cycles.

The disclosed coating systems or coating compositions preferably have improved, viz., lower, volatile organic content (VOC). The coating systems or coating compositions desirably have a VOC of less than about 5%, based on the total weight of the coating system, preferably a VOC of less than about 2%, more preferably a VOC of less than about 0.5%. Volatile organic compounds are defined in U.S. Pat. No. 6,048,471 (Henry) and in the U.S. Federal Register Jun. 16, 1995, volume 60, number 111.

Preferred compositions of the second coating system include less than 10 weight %, more preferably less than 7 weight %, and most preferably less than 5 weight % volatile organic compounds (VOC) based upon the total weight of the composition. In addition, these compositions may also contain an optional coalescent, preferably a low VOC coalescent such as is described in U.S. Pat. No. 6,762,230.

Having thus described the preferred embodiments of the present invention, those of skill in the art will readily appreciate that the teachings found herein may be applied to yet other embodiments within the scope of the claims hereto attached.

The invention will be described by the following non-limiting examples. Unless otherwise indicated, all parts and percentages are by weight.

EXAMPLES

Example 1

Runs: 1a and 1b

Run 1a: A reactor was charged with 758 parts of deionized water and 1.6 parts Triton X-405. The reaction mixture was heated to 75° C. under a nitrogen blanket. During heating, a pre-emulsion was formed containing: 246 parts of deionized (DI) water, 31 parts of Triton X-405, 11.2 parts RHODAPON UB, 0.7 parts sodium persulfate, 304 parts of styrene, 130 parts of methyl methacrylate, 204 parts of butyl acrylate, and 13 parts of methacrylic acid. Once the reaction mixture reaches 75° C., 1.6 parts of sodium persulfate was added to the reactor and the monomer feed started for a 3.5 hour feed rate. The reaction temperature was held between 80° C. to 85° C., during polymerization. Once the pre-emulsion feed was complete, the container was rinsed with 20 parts of deionized water and the reaction was held 30 minutes. A post reaction consisting of 0.7 parts t-butyl hydroperoxide mixed with 20 parts of deionized water and 0.5 parts of isoascorbic acid mixed with 20 parts of deionized water was then added over 30 minutes. The resulting latex polymer was then cooled to below 30° C. and poured into two containers.

Run 1b: To 1000 parts of the latex from Example 1a, 108 parts of HELOXY™ 48 was added over 5-10 minutes and the mixture held for 1 hour.

Example 2

Runs 2a-2c

Run 2a (Comparative Example): A latex composition was prepared by mixing the following ingredients: 44 parts water and 56 parts of latex from Run 1a.

Run 2b: A two-part "epoxy-amine" composition was prepared by mixing the following ingredients: Part 'A' contains 51.6 parts of latex from Run 1b; and Part 'B' contains 46.6 parts water and 1.8 parts EPIKURE™ 3295 amine from Hexion.

Run 2c: A two-part "epoxy-amine" composition was prepared by mixing the following ingredients: Part 'A' contains 36.1 parts latex from Run 1b; and Part 'B' contains 36.8 parts water, 25.8 parts potassium silicate (KASIL 1); and 1.3 parts EPIKURE 3295 amine from Hexion.

Equal parts by weight of 'A' and 'B' are mixed and allowed to sit for a 10-minute induction period before application to a substrate. In preferred embodiments, the coating is then applied to a fiber cement article at a theoretical dry film thickness of 0.00127 to 0.001778 cm (0.5 to 0.7 mils) by either a single coating application or by two or more coating applications, and a portion of the water is removed, either by air drying, a heated drying stage or by application to a warm substrate (e.g., about 38° C.). The coated substrate may then be topcoated, e.g., using a topcoat as disclosed in U.S. patent application Ser. No. 11/560,329.

Example 3

Acetoacetyl Functional Latex Polymer

A reactor was charged with 567 parts of deionized water, and 1.5 parts RHODAPON™ UB. The reaction mixture was heated to 75° C. under a nitrogen blanket. During heating, a pre-emulsion was formed containing: 331 parts of deionized water, 56.8 parts of RHODAPON UB, 0.9 parts ammonium persulfate, 149 parts of 2-ethyl hexyl acrylate, 732 parts of butyl methacrylate, 28.1 parts of AAEM, and 28.1 parts of methacrylic acid. Once the reaction mixture reaches 75° C., 2.8 parts of ammonium persulfate was added to the reactor and the monomer feed started for a 3 hour feed rate. The reaction temperature was held between 80° C. to 85° C., during polymerization. Once the pre-emulsion feed was complete, the container was rinsed with 20 parts of deionized water and the reaction was held 30 minutes. A post reaction consisting of 0.9 parts t-butyl hydroperoxide mixed with 20 parts of deionized water and 0.7 parts of isoascorbic acid mixed with 20 parts of deionized water were added over 30 minutes. The resulting latex polymer was then cooled to 40° C. and 28% concentrate ammonia was added to adjust the pH to 7.5-8.5 and deionized water was added to adjust the weight solids to 48%.

Example 4

Multistage Acetoacetyl Functional Latex Polymer

A reactor was charged with 547 parts of deionized water, and 15 parts RHODAPON UB. The reaction mixture was heated to 75° C. under a nitrogen blanket. During heating, pre-emulsion 1 was formed containing: 215 parts of deionized water, 37 parts of RHODAPON UB, 0.6 parts ammonium persulfate, 103 parts of 2-ethyl hexyl acrylate, 470 parts of butyl methacrylate, 18 parts of AAEM, and 18 parts of methacrylic acid. Pre-emulsion 2 was formed containing: 116 parts of deionized water, 20 parts of RHODAPON UB, 0.3 parts ammonium persulfate, 223 parts of methylmethacrylate, 85 parts of butyl methacrylate, 10 parts of AAEM, and 10 parts of methacrylic acid. Once the reaction mixture reaches 75° C., 2, 8 parts of ammonium persulfate was added to the reactor and the pre-emulsion 1 started for a 2 hour feed rate. Once pre-emulsion 1 was added, the container was rinsed with 20 parts deionized water and pre-emulsion 2 started for a 1 hour feed rate. The reaction temperature was held between 80° C. to 85° C., during polymerization. Once the pre-emulsion 2 feeds was complete, the container was rinsed with 20 parts of deionized water and the reaction was held 30 minutes. A post reaction consisting of 0.9 parts t-butyl hydroperoxide mixed with 20 parts of deionized water and 0.7 parts of isoascorbic acid mixed with 20 parts of deionized water was then added over 30 minutes. The resulting latex polymer was then cooled to 40° C. and a 28% concentrate ammonia was added to adjust the pH to 7.5-8.5 and deionized water was added to adjust the weight solids to 48%.

Example 5a-c

Paint Compositions

In a mixing vessel equipped with a high-speed mixer and dispersion blade, was added the following ingredients in order (parts by weight):

| Ingredient | Example 5a | Example 5b | Example 5c |
|---|---|---|---|
| Water | 101 | 101 | 101 |
| Cellosize QP 09-L Thickener | 0.8 | 0.8 | 0.8 |

The above ingredients were mixed for 5 minutes or until homogenous, and then the following ingredients were added (parts by weight):

| Ingredient | | Example 5a | Example 5b | Example 5c |
|---|---|---|---|---|
| Dehydran 1620 | Defoamer | 1.5 | 1.5 | 1.5 |
| Texanol | Co-solvent | 15 | 15 | 15 |
| Disperbyk 190 | Dispersant | 7 | 7 | 7 |
| Ammonia 26 BE | Neutralizer | 1 | 1 | 1 |
| Ti Pure R902-28 | Pigment | 220 | 220 | 220 |
| ASP 170 Alum. Silicate | Extender | 85 | 85 | 85 |

The above ingredients were mixed at high speed for 15 minutes, and then the following ingredients were added (parts by weight):

| Ingredient | | Example 5a | Example 5b | Example 5c |
|---|---|---|---|---|
| Ammonia 26 BE | Neutralizer | 1 | 1 | 1 |

To the above was added the following in order (parts by weight):

| Ingredient | | Example 5a | Example 5b | Example 5c |
|---|---|---|---|---|
| Water | | 46.6 | 46.6 | 6.9 |
| Example 2, Run 1 latex | | 596.2 | — | — |
| Example 3 latex | | — | 596.2 | — |
| Neocryl XK 90 latex | | — | — | 636 |
| Water | | 16.7 | 16.7 | 16.7 |
| Byk 024 | Defoamer | 1 | 1 | 1 |
| Acrysol RM-2020NPR | Thickener | 1.5 | 1.5 | 1.5 |

The above were mixed for 15 minutes using moderate agitation.

Example 6

Tape Adhesion Test Results

A 15.24×21 cm board sample was prepared for testing as outlined in Example 2 and then a second system applied using the following technique.

Preheat board sample to 43° C. (~110° F.) using a convection oven set at 149° C. (300° F.). Apply approximately 5.2 grams of topcoat by spreading evenly over the surface of the board using either a bristle or foam brush. Immediately after coating the board, place it in the 149° C. (300° F.) oven until the board surface temperature reaches 60° C. (140° F.). Remove sample and allow to cool to room temperature.

Adhesion test procedures: After a board sample has been sealed, top-coated and dried, it can be tested for coating adhesion using 3M brand 250 standard tape. The adhesion of a coating system to the surface of a board may be tested after the coating system has been applied and cured/dried to the specifications of the coating system. To the surface of the board, was applied a 7.62 cm (3 inch) strip of 3M brand #250 standard masking tape. The tape was firmly pressed onto to the board surface using either a thumb, applying a minimum of 20.67 kPa (5 psi) to the full length of the tape for 10 seconds. Two minutes was allowed for the adhesive to equilibrate on the board surface. After equilibrating, the tape was removed rapidly (equal to or less than 1 second) by pulling it up at a 90 degree angle. Failure was reported as a combination of coating adhesion failure and also board surface failure.

Comparative Test Results:

| | TEST 1 | TEST 2 | TEST 3 | TEST 4 |
|---|---|---|---|---|
| First Coat | Example 2, Run 2a | Example 2, Run 2a | Example 2, Run 2a | Example 2, Run 2a |
| Second Coat | Example 5a | Example 5b | Example 5c | Duration House Paint from Sherwin Williams |
| % Adhesion Loss | 90% | 90% | 85% | 85% |

Invention Test Results:

| | TEST 5 | TEST 6 | TEST 7 | TEST 8 |
|---|---|---|---|---|
| First Coat | Example 2, Run 2b | Example 2, Run 2b | Example 2, Run 2b | Example 2, Run 2b |
| Second Coat | Example 5a | Example 5b | Example 5c | Duration House Paint from Sherwin Williams |
| % Adhesion Loss | <1% | <1% | <1% | 4-8% |

| | TEST 9 | TEST 10 | TEST 11 | TEST 12 |
|---|---|---|---|---|
| First Coat | Example 2, Run 2c | Example 2, Run 2c | Example 2, Run 2c | Example 2, Run 2c |
| Second Coat | Example 5a | Example 5b | Example 5c | Duration House Paint from Sherwin Williams |
| % Adhesion Loss | <1% | <1% | 2-5% | 1-2% |

Example 7

Oxirane Functional Latex

A two-piece three necked flask equipped with a stirrer, condenser, thermocouple, and nitrogen inlet was charged with 720 grams of deionized water and 1.25 grams of Triton X-405 (Rohm & Haas). The material was stirred and heated to 80 to 90° C. A monomer mix was prepared separately in a 2-liter beaker with agitation. The beaker is charged with 291 grams of water, 23.8 grams of Triton X-405, 592 grams of styrene, 202 grams of butyl acrylate, 16.7 grams of methacrylic acid, and 65.8 grams of glycidyl methacrylate while mixing to form a pre-emulsion. 2.0 grams of sodium persulfate was dissolved into the emulsion. At 80-90° C. 2.0 grams of sodium persulfate dissolved in 20 grams of deionized water was charged to the reactor. The monomer emulsion was then fed to the reactor over 3½ hours at 80-90° C. The emulsion was rinsed with 20 grams of deionized water. Then the reaction was held for 30 minutes. Tert-butyl hydroperoxide, 1.0 gram, was added, followed by a solution of 07 grams of erythorbic acid and 20 grams of water. After 20-30 minutes, the reaction was cooled and reduced with 20 grams of water. The solids were adjusted to about 45% by weight. The MFFT of the latex was greater than 60° C.

Example 8a-c

Coalescing Ability of Aliphatic Epoxy Resin

8a. To 100 grams of the latex formed in Example 7 were added 7.9 grams of Heloxy 68 and the solids adjusted to 45%.

8b. To 100 grams of the latex formed in Example 7 were added 11.3 grams of Heloxy 68 and the solids adjusted to 45%.

8c. To 100 grams of the latex formed in Example 7 were added 15 grams of Heloxy 68 and the solids adjusted to 45%.

| | Example 7 | Example 8a | Example 8b | Example 8c |
|---|---|---|---|---|
| MFFT | >60° C. | 21° C. | 11° C. | <5° C. |

The aliphatic epoxy resin acts as a coalescent, lowering MFFT and allowing lower VOC formulations to be prepared.

Example 9

Oxirane Functional Latex

A two-piece three necked flask equipped with a stirrer, condenser, thermocouple, and nitrogen inlet was charged with 720 grams of deionized water and 1.25 grams of Triton X-405 (Rohm & Haas) The material was stirred and heated to 80 to 90° C. A monomer mix was prepared separately in a 2 liter beaker with agitation. The beaker was charged with 291 grams of water, 23.8 grams of Triton X-405, 458 grams of styrene, 336 grams of butyl acrylate, and 16.7 grams of methacrylic acid, and 65.8 grams of glycidyl methacrylate while mixing to form a preemulsion. 2.0 grams of sodium persulfate was dissolved into the emulsion. At 80-90° C. 2.0 grams of sodium persulfate dissolved in 20 grams of deionized water was charged to the reactor. The monomer emulsion was then fed to the reactor over 3½ hours at 80-90° C. The emulsion was rinsed with 20 grams of deionized water. The reaction was held for 30 minutes. Tert-butyl hydroperoxide, 1.0 gram, was added, followed by a solution of 0.7 grams of erythorbic acid and 20 grams of water. After 20-30 minutes, the reaction was cooled and reduced with 20 grams of water. The solids were adjusted to about 45% by weight.

Example 10a-c

Pigmented Coating Compositions

A pigment grind paste was made as follows:

| Raw Material | Supplier | Location | Wt. % |
|---|---|---|---|
| Add the following to a mixture container, apply high shear agitation for 5 minutes: | | | |
| DI Water | NA | | 29.8 |
| Attagel 50 | Engelhard | Iselin, NJ 08830 | 1.5 |
| After 5 minutes, add the following in order under high agitation: | | | |
| Tamol 731-1 25% | Rohm & Haas | Philadelphia, PA 19106-2399 | 1.5 |
| Tamol 850 | Rohm & Haas | Philadelphia, PA 19106-2399 | 3.0 |
| Byk 035 | Byk (Altana) | Wesel Germany 46462 | 0.9 |
| Titanium Dioxide | DuPont | Wilmington, DE | 42.8 |
| Red Iron Oxide | Elementis | East St. Louis, IL 62204 | 3.7 |
| Yellow Iron Oxide | Elementis | East St. Louis, IL 62204 | 14.0 |
| Carbon Black | Elementis | East St. Louis, IL 62204 | 2.8 |

Example 10a

Pigmented Epoxy Modified Coating

| Raw Material | Supplier | Location | Wt. % |
|---|---|---|---|
| The following were added in order under moderate mixing: | | | |
| Example 9 | | | 23.3 |
| Paraplex WP-1 | Rohm & Haas | Philadelphia, PA 19106-2399 | 3.7 |

-continued

| Raw Material | Supplier | Location | Wt. % |
|---|---|---|---|
| Mix for 30 minutes, then add the following in order: | | | |
| Grind Paste | (From Example 11) | | 9.2 |
| Epicure 3295 | Hexion | Houston, TX 77082 | 0.25 |
| DI Water | NA | | 32.9 |
| DI Water (Reduction) | NA | | 16.5 |
| Kasil 1 | PQ Corporation | Valley Forge, PA 19482-8040 | 14.0 |

Example 10b

Pigmented Epoxy Modified Coating

| Raw Material | Supplier | Location | Wt. % |
|---|---|---|---|
| The following were added in order under moderate mixing: | | | |
| Example 9 | | | 22.0 |
| Heloxy 48 | | | 3.5 |
| Mix for 30 minutes, and then add the following in order: | | | |
| Grind Paste | (From Above) | | 8.7 |
| DI Water | NA | | 51.3 |
| Kasil 1 | PQ Corporation | Valley Forge, PA 19482-8040 | 13.2 |
| EPIKURE 3295 | Hexion | Houston, TX 77082 | 1.3 |

Example 10c

Pigmented Epoxy Modified Coating

| Raw Material | Supplier | Location | Wt. % |
|---|---|---|---|
| The following were added in order under moderate mixing: | | | |
| Example 9 | | | 21.9 |
| Heloxy 68 | Hexion | Houston, TX 77082 | 3.5 |
| Mix for 30 minutes, and then add the following in order: | | | |
| Grind Paste | (From Above) | | 8.7 |
| DI Water | NA | | 51.4 |
| Kasil 1 | PQ Corporation | Valley Forge, PA 19482-8040 | 13.2 |
| EPIKURE 3295 | Hexion | Houston, TX 77082 | 1.3 |

The epoxy modified coatings should also provide an improved freeze-thaw system for fiber cement

Example 11

Tape Adhesion test Results

A 15.24×21 cm board sample was prepared for testing as outlined in Example 2 using the coating prepared in Example 10 and then a second coating system applied using the following technique.

Preheat board sample to about 43° C. (~110° F.) using a convection oven set at 149° C. (300° F.). Apply approximately 5.2 grams of topcoat by spreading evenly over the surface of the board using either a bristle or foam brush. Immediately after coating the board, place it in the 149° C. (300° F.) oven until the board surface temperature reaches 60° C. (140° F.). Remove sample and allow the board sample to cool to room temperature. The second coating system applied was prepared as described in Rohm & Haas Formulation W-264-8.

Adhesion Test Procedures:

After a board sample has been sealed, top-coated and dried, it was tested for coating adhesion using 3M brand 250 standard tape after the board was submerged in room temperature water overnight. To the surface of the board, a strip of 3M brand #250 standard masking tape, at least 7.62 cm (3 inch) in length, was applied. The tape was firmly pressed to the board surface applying a minimum of 20.67 kPa (5 psi) (with a thumb or forefinger) to the full length of the tape for 10 seconds. Two minutes were allowed for the adhesive to equilibrate on the board surface. After equilibrating, the tape was removed rapidly (equal to or less than 1 second) by pulling it up at a 90 degree angle. Failure was reported as a combination of coating adhesion failure or board surface failure.

|  | TEST 11A | TEST 11B | TEST 11C |
|---|---|---|---|
| First Coat | Example 10a | Example 10b | Example 10c |
| % Adhesion Loss | <5% | 5-10% | <5% |

The epoxy modified coatings should also provide an improved freeze-thaw system for fiber cement.

It is also noted that the compositions of the invention can be used with other coating compositions such as, those disclosed in U.S. Patent Application Nos. 60/764,044, 60/764,131, 60/764,242, and 60/773,482, 60/764,103, 60/802,185 and 60/802,186.

All patents, patent applications and literature cited in the specification are hereby incorporated by reference in their entirety. In the case of any inconsistencies, the present disclosure, including any definitions therein will prevail. The invention has been described with reference to various specific and preferred embodiments and techniques. However, it should be understood that many variations and modifications may be made while remaining within the invention.

What is claimed is:

1. An aqueous coating system comprising:
   one or more multistage latex polymers containing between 50 and 90 wt. % hard segments having a Tg between 30 and 130° C. and between 10 and 50 wt. % soft segments having a Tg between 0 and 25° C.;
   an aliphatic epoxy resin system having an oxirane functional component that is distinct from the one or more multistage latex polymers, wherein the oxirane functional component in the aliphatic epoxy resin system has an epoxy equivalent weight less than 1000; and
   wherein the aqueous coating system includes one or more coating compositions that may be applied in one or more layers and contains about 2-50 wt. % aliphatic epoxy resin based on total solids, and the aqueous coating system when dried is block-resistant.

2. The aqueous coating system of claim 1, wherein the the one or more multistage latex polymers comprise one or more epoxy functional groups.

3. The aqueous coating system of claim 2, wherein at least one of the latex polymers is made from glycidyl methacrylate, glycidyl acrylate, 4-hydroxybutyl acrylate glycidylether, and combinations thereof.

4. The aqueous coating system of claim 1, wherein minimum film forming temperature of a blend of the one or more multistage latex polymers with the oxirane functional component of the aliphatic epoxy resin system is less than about 20° C.

5. The aqueous coating system of claim 1, wherein the the one or more multistage latex polymers comprise acetoacetoxy-functionality.

6. The aqueous coating system of claim 1, wherein the one or more multistage latex polymers comprise one or more amine groups.

7. The aqueous coating system of claim 1, wherein the aqueous coating system further comprises about 2 to 50 wt. % of a silicate salt;
   wherein the silicate salt is potassium silicate, ammonium silicate, sodium silicate, lithium silicate, or mixtures thereof.

8. The aqueous coating system of claim 1, wherein the oxirane functional component is the reaction product of an oxirane precursor molecule with an alcohol containing material or a carboxylic acid containing material.

9. The aqueous coating system of claim 8, wherein the oxirane functional component is the reaction product of an oxirane precursor molecule with an alcohol containing material, and at least a portion of the alcohol containing material is ethylene glycol, propylene glycol, 1,3-propanediol, 1,4-butanediol, 1,3-butanediol, 2-methyl-1,3-propanediol, neopentyl glycol, 2,2-butylethyl propanediol, hexanediol, diethylene glycol, dipropylene glycol, polyethylene glycols, polypropylene glycols, cyclohexane dimethylol, 2,2,3-trimethylpentanediol, trimethylol propane, ethoxylated trimethylol propane, propoxylated trimethylol propane, glycerine, propoxylated glycerine, pentaerythritol, ethoxylated pentaerythritol, propoxylated pentaerythritol, dipentaerythritol, tripentaerythritol, ethoxylated and propoxylated dipentaerythritol, ethoxylated and propoxylated tri-pentaerythritol, ditrimethylolpropane, hydroxypivalyl hydroxypivalate, hydrogenated bisphenol A, ethoxylated and propoxylated hydrogenated bisphenol A, isosorbide, or mixtures thereof.

10. The aqueous coating system of claim 8, wherein the oxirane functional component is the reaction product of an oxirane precursor molecule with a carboxylic acid containing material, and at least a portion of the carboxylic acid containing material is malonic acid, succinic acid, glutaric acid, sebacic acid, fumaric acid, adipic acid, pimelic acid, hexahydrophthalic acid, 1,3- and 1,4 cyclohexanedicarboxylic acid, orthophthalic acid, isophthalic acid, maleic acid, chlorendic acid, glycolic acid, citric acid, trimellitic acid, lactic acid, caprolactone, or mixtures thereof.

11. The aqueous coating system of claim 8, wherein the oxirane functional component has an epoxy equivalent weight of about 90 to 350.

12. A coated article comprising a substrate, at least a portion of which is coated with one or more layers of the aqueous coating system of claim 1, and one or more layers of a second coating system comprising a latex polymer.

13. A coated article comprising a substrate, at least a portion of which is coated with one or more layers of the aqueous coating system of claim 1, and one or more layers of a second coating system comprising a functionalized latex polymer, a multistage latex polymer, or a functionalized, multistage latex polymer.

14. The aqueous coating system of claim 1, wherein the aqueous coating system further comprises one or more olefinic compounds and is radiation curable.

15. A coated article comprising a substrate, at least a portion of which is coated with one or more layers of the aqueous coating system of claim 1, and one or more layers of a second coating system comprising (i) a latex containing primer, (ii) a latex containing topcoat, or (iii) both (i) and (ii).

16. The coated article of claim 15, wherein the second coating system comprises a functionalized latex polymer, a multistage latex polymer or a functionalized, multistage latex polymer.

17. The coated article of claim 16, wherein the second coating system comprises (i) an acetoacetoxy-functional latex containing primer, or (ii) an acetoacetoxy-functional latex containing topcoat, or (iii) both (i) and (ii).

18. The aqueous coating system of claim 1 wherein the multistage latex polymer has a hard segment having a Tg between 30 and 70° C.

19. The aqueous coating system of claim 1, wherein the aqueous coating system contains about 20-80 wt. % latex polymer based on total solids.

20. The aqueous coating system of claim 1, wherein the aqueous coating system contains about 2-15 wt. % amine crosslinker based on total solids with a reactive hydrogen equivalent weight between 20 and 500.

21. The aqueous coating system of claim 1, further comprising one or more pigments.

22. The aqueous coating system of claim 1, wherein the aliphatic epoxy resin system acts as a coalescent.

23. The aqueous coating system of claim 22, wherein the minimum film forming temperature of the aqueous coating system is less than about 20° C.

24. The aqueous coating system of claim 1, wherein the aliphatic epoxy resin system lowers the minimum film forming temperature of the aqueous coating system.

25. The aqueous coating system of claim 24, wherein the minimum film forming temperature of the aqueous coating system is less than about 30° C.

26. A coated article comprising a substrate, at least a portion of which is coated with one or more layers of the aqueous coating system of claim 1.

27. The coated article according to claim 26, wherein the substrate is cement fiberboard.

\* \* \* \* \*